(12) United States Patent
Shirakawa et al.

(10) Patent No.: US 8,269,837 B2
(45) Date of Patent: Sep. 18, 2012

(54) DIGITAL CAMERA AND IMAGE PROCESSING APPARATUS

(75) Inventors: Masanobu Shirakawa, Nagano (JP); Shuji Tsuji, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1184 days.

(21) Appl. No.: 11/003,783

(22) Filed: Dec. 6, 2004

(65) Prior Publication Data
US 2005/0152002 A1 Jul. 14, 2005

Related U.S. Application Data

(63) Continuation of application No. PCT/JP03/07139, filed on Jun. 5, 2003.

(30) Foreign Application Priority Data

Jun. 5, 2002 (JP) ................ P2002-164041

(51) Int. Cl.
| | |
|---|---|
| H04N 5/228 | (2006.01) |
| H04N 5/232 | (2006.01) |
| H04N 9/07 | (2006.01) |
| H04N 1/21 | (2006.01) |
| H04N 1/04 | (2006.01) |
| H04N 20/75 | (2006.01) |
| G03B 17/18 | (2006.01) |
| G06F 3/048 | (2006.01) |

(52) U.S. Cl. ............ 348/207.99; 348/207.1; 348/208.1; 348/211.99; 348/231.7; 348/266; 358/302; 358/491; 455/3.05; 396/281; 715/854

(58) Field of Classification Search .................. 345/641; 348/231.99, 333.12, 207.99, 148, 584, 641, 348/333.13, 239, 333.02, 593, 222.02, 208.1, 348/209.99, 266, 274; 455/3.05; 396/281; 715/854
See application file for complete search history.

(56) References Cited

U.S. PATENT DOCUMENTS
4,456,931 A * 6/1984 Toyoda et al. ............. 348/231.7
(Continued)

FOREIGN PATENT DOCUMENTS
CN 1212102 A 12/2007
(Continued)

OTHER PUBLICATIONS
Euopean Search Report dated Aug. 3, 2006.
(Continued)

*Primary Examiner* — Akwasi M Sarpong
(74) *Attorney, Agent, or Firm* — Sughrue Mion, PLLC

(57) ABSTRACT

Default image data and subject image data are stored separately in nonvolatile memory and when the subject image data stored in the nonvolatile memory is displayed in a standard playback mode, the subject image data is displayed on an LCD at a specific scaling factor (first scaling factor) determined by the image size of the subject image data regardless of whether or not default image data is set for the subject image data. On the other hand, when composite image data is displayed in a print preview mode, scaling processing to display the subject image data on the LCD at a smaller scaling factor than the first scaling factor is performed so that the whole of the composite image data can be displayed on one screen of the display.

21 Claims, 19 Drawing Sheets

U.S. PATENT DOCUMENTS

| | | | |
|---|---|---|---|
| 4,641,255 A | | 2/1987 | Hohmann |
| 4,672,117 A | | 6/1987 | Abou-Gharbia et al. |
| 5,077,610 A | * | 12/1991 | Searby et al. .................. 348/593 |
| 5,506,946 A | | 4/1996 | Bar et al. |
| 5,583,536 A | * | 12/1996 | Cahill, III ..................... 345/641 |
| 5,623,587 A | | 4/1997 | Bulman |
| 5,845,166 A | * | 12/1998 | Fellegara et al. ............. 396/429 |
| 5,914,748 A | * | 6/1999 | Parulski et al. ............... 348/239 |
| 5,978,016 A | * | 11/1999 | Lourette et al. ................. 348/64 |
| 6,141,063 A | | 10/2000 | Gehrmann |
| 6,195,513 B1 | | 2/2001 | Nihei et al. |
| 6,343,987 B2 | * | 2/2002 | Hayama et al. ................... 463/1 |
| 6,441,811 B1 | | 8/2002 | Sawada et al. |
| 6,441,854 B2 | * | 8/2002 | Fellegara et al. ........ 348/333.13 |
| 6,556,243 B1 | | 4/2003 | Dotsubo et al. |
| 6,556,775 B1 | | 4/2003 | Shimada |
| 6,738,059 B1 | * | 5/2004 | Yoshinaga et al. ............ 345/419 |
| 6,847,388 B2 | * | 1/2005 | Anderson ...................... 715/854 |
| 6,867,801 B1 | * | 3/2005 | Akasawa et al. ........... 348/222.1 |
| 6,964,537 B1 | * | 11/2005 | Ong ............................... 402/14 |
| 6,987,535 B1 | | 1/2006 | Matsugu et al. |
| 7,057,650 B1 | * | 6/2006 | Sakamoto ..................... 348/239 |
| 7,057,658 B1 | | 6/2006 | Shioji et al. |
| 7,079,706 B2 | | 7/2006 | Peterson |
| 7,088,396 B2 | * | 8/2006 | Fredlund et al. ......... 348/333.02 |
| 7,164,441 B1 | * | 1/2007 | Miyazaki et al. .............. 348/239 |
| 7,221,395 B2 | | 5/2007 | Kinjo |
| 7,342,486 B2 | * | 3/2008 | Tsukada et al. ............... 340/438 |
| 7,471,312 B2 | * | 12/2008 | Toyoda ....................... 348/207.2 |
| 2002/0080251 A1 | | 6/2002 | Moriwaki |
| 2002/0090910 A1 | * | 7/2002 | Takemura .................... 455/3.05 |
| 2002/0097327 A1 | | 7/2002 | Yamasaki |
| 2002/0140829 A1 | * | 10/2002 | Colavin et al. ........... 348/231.99 |
| 2002/0176636 A1 | * | 11/2002 | Shefi .............................. 382/285 |
| 2003/0026609 A1 | * | 2/2003 | Parulski ........................ 396/281 |
| 2004/0141070 A1 | * | 7/2004 | Chiku et al. ............. 348/231.99 |
| 2004/0173686 A1 | * | 9/2004 | Al Amri ........................ 235/492 |
| 2005/0016702 A1 | * | 1/2005 | Ash et al. ...................... 162/140 |
| 2005/0259173 A1 | * | 11/2005 | Nakajima et al. ......... 348/333.12 |
| 2006/0125924 A1 | * | 6/2006 | Ing-Song et al. ......... 348/207.99 |
| 2007/0019072 A1 | * | 1/2007 | Bengtsson et al. ............. 348/148 |

FOREIGN PATENT DOCUMENTS

| | | |
|---|---|---|
| DE | 19814409 A | 10/1998 |
| EP | 0 647 057 A1 | 4/1995 |
| EP | 0 675 648 A2 | 10/1995 |
| EP | 08-37428 A | 4/1998 |
| EP | 0944248 A2 | 9/1999 |
| EP | 1100262 A1 | 5/2001 |
| JP | 10-164498 A | 6/1998 |
| JP | 10-271427 A | 10/1998 |
| JP | 11-04403 A | 1/1999 |
| JP | 11-8818 A | 1/1999 |
| JP | 11-008831 A | 1/1999 |
| JP | 11-168689 A | 6/1999 |
| JP | 11-187314 A | 7/1999 |
| JP | 11-196362 A | 7/1999 |
| JP | 11-234506 A | 8/1999 |
| JP | 11-298764 A | 10/1999 |
| JP | 2000-307941 A | 11/2000 |
| JP | 2000-350086 A | 12/2000 |
| JP | 2000-358206 A | 12/2000 |
| JP | 2001-24927 A | 1/2001 |
| JP | 2001-45352 A | 2/2001 |
| JP | 2001-127986 A | 5/2001 |
| JP | 2001-177764 A | 6/2001 |
| JP | 2001-285420 A | 10/2001 |
| JP | 2002-44416 A | 2/2002 |
| JP | 2002-044416 A | 2/2002 |
| JP | 2002-158922 A | 5/2002 |
| WO | WO 98/30020 A1 | 7/1998 |

OTHER PUBLICATIONS

International Search Report dated Aug. 5, 2003.
Supplemental European Search Report dated Feb. 25, 2008.
Office Action dated Apr. 5, 2011 from U.S. Appl. No. 12/494,820.

* cited by examiner

FIG. 13 (A)
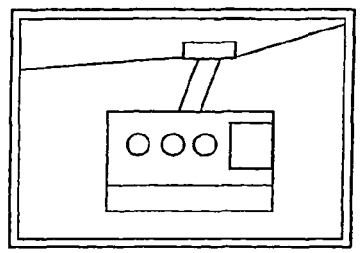
FIG. 13 (B1)
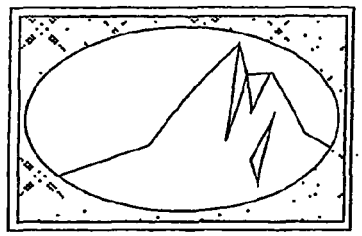
FIG. 13 (B2)
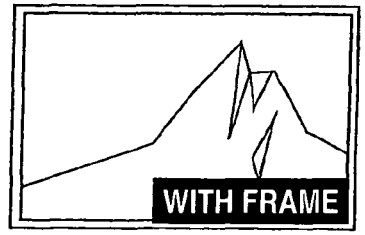
FIG. 13 (C)
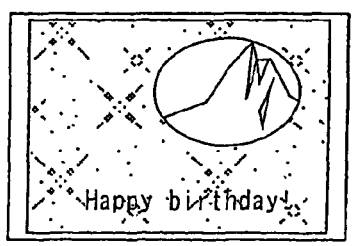

FIG. 16 daen01.usd (LAYOUT DEFINITION FILE)

PRINT PAPER SIZE; POSTCARD
PRINT PAPER ORIENTATION; LANDSCAPE

SUBJECT IMAGE DRAWING;
 IMAGE:
 IMAGE FRAME: (x1, x2), (x2, y2)

DEFAULT IMAGE DRAWING;
 IMAGE: birthday.eff
 IMAGE FRAME: (x3, y3), (x4, y4)

DIGITAL CAMERA AND IMAGE PROCESSING APPARATUS

This is a Continuation of Application No. PCT/JP03/07139 filed Jun. 5, 2003. The entire disclosure of which is incorporated herein by reference.

TECHNICAL FIELD

This invention relates to a digital camera and an image processing apparatus.

BACKGROUND ART

A digital camera has a use of recording data as material of a composite image, for example. The composite image is widely used to print a greeting card with a photo, a framed photo seal, etc. Therefore, it is desirable that the digital camera should be provided with a function of displaying the combination result on an electronic view finder.

JP-A-2001-45352 discloses a digital camera for recording composite image data provided by combining background representation data and subject representation data in external memory and displaying the composite image on a liquid crystal panel after photographing.

JP-A-2000-358206 discloses a digital camera for recording subject representation data and data to set the print range, etc., to print the subject representation data so as to comply with a certification photo, etc., in memory in association with each other and displaying a subject image on an external display together with a frame indicating the trimming area at the printing time.

By the way, in image combination processing, to combine a subject image and any other image recorded in a digital camera and print a greeting card with the subject image allocated to a half of a postcard and a message and an illustration allocated to the remaining half, for example, the image size may become large, namely, the number of pixels may increase as the images are combined. Generally, the digital camera is designed so as to be able to record subject images in several sizes of 640×480 pixels, etc., and display a subject image of a specific size on a display at high speed. However, if the size of the subject image that can be displayed at high speed differs from the image size resulting from combination, scaling processing of interpolation, thinning out, etc., needs to be performed by executing a program and thus the display speed of the composite image becomes low. Therefore, in a mode in which a plurality of subject images recorded in memory are selected in order for display, when a subject image used for combination is selected, if an attempt is made to display a composite image rather than the subject image, if the subject image and the composite image differ in image size, the wait time until the subsequent subject image is displayed is prolonged as the composite image is displayed; this is a problem.

DISCLOSURE OF THE INVENTION

The invention has been created to solve such a problem and it is an object of the invention to provide a digital camera and an image processing apparatus for enabling the user to check the result of combining a subject image and any other image on one screen and check the subject images recorded in memory in a short time.

To accomplish the above-described object, a digital camera according to the invention is characterized by an image processing unit for creating subject image data representing a subject image based on output of an image sensor; a setting unit for setting a default image associated with a subject image; a record unit for storing subject image data in nonvolatile memory in association with default image data representing the default image set by the setting unit; a standard playback unit for displaying an image represented by the subject image data stored in the nonvolatile memory at a first scaling factor so that whether or not the subject image data is associated with default image data can be determined; and a print preview unit for displaying on one screen of the display the whole of a composite image into which the subject image represented by the subject image data and the default image represented by the default image data associated with the subject image data are combined with scaling processing to display the subject image represented by the subject image data on the display at a smaller scaling factor than the first scaling factor. The scaling factor mentioned here is a value indicating the ratio of the number of pixels after processing to the number of pixels before processing when interpolation processing or thinning-out processing is performed for image data in response to the number of pixels of the display area.

In the digital camera according to the invention, the default image data and the subject image data are stored separately in the nonvolatile memory and when the subject image data stored in the nonvolatile memory is displayed by the standard playback unit, the subject image represented by the subject image data is displayed on the display at a specific scaling factor (first scaling factor) determined by the image size of the subject image represented by the subject image data and the screen size of the display regardless of whether or not default image data is associated with the subject image data. Therefore, according to the digital camera according to the invention, if the configuration is a configuration wherein the subject image represented by the subject image data can be displayed at high speed at the first scaling factor, even if the composite image provided by combining the image represented by the default image data and the image represented by the subject image data are combined has a larger size than the subject image, the subject image recorded in the memory can be checked in a short time. On the other hand, the combining result of the default image and the subject image can be displayed by the print preview unit. When the composite image is displayed by the print preview unit, scaling processing to display the subject image represented by the subject image data on the display at a smaller scaling factor than the first scaling factor is performed so that the whole of the composite image can be displayed on one screen of the display. Therefore, according to the digital camera according to the invention, even if the composite image provided by combining the default image represented by the default image data and the subject image represented by the subject image data are combined has a larger size than the subject image represented by the default image data, the result of combining the subject image and the default image can be checked on one screen.

Further, the digital camera according to the invention is characterized in that the standard playback unit displays text or a pattern indicating that subject image data is associated with default image data on the display together with the subject image. The subject image data recorded in the nonvolatile memory can be checked in a short time as compared with the case where the default image is displayed for making it possible to recognize that the default image data is associated with the subject image data.

Further, the digital camera according to the invention is characterized in that the standard playback unit combines a part of the default image represented by default image data with the subject image represented by subject image data and displays the combining result on the display. The default image is displayed for making it possible to recognize that the default image data is associated with the subject image data, whereby it is made possible to easily determine whether or not the default image data is associated with the subject image data.

Further, the digital camera according to the invention is characterized further by a automatic switch unit for causing the standard playback unit to display the subject image represented by the subject image data associated with default image data for a predetermined time and then causing the print preview unit to display a composite image. Accordingly, the labor and time for checking the combining result of the subject image and the default image can be lessened.

Further, the digital camera according to the invention is characterized further by a manual switch unit for accepting a switch command when the subject image represented by the subject image data associated with default image data is displayed by the standard playback unit and causing the print preview unit to display a composite image after accepting the switch command. Accordingly, unintended display of the combining result of the subject image and the default image can be prevented.

To accomplish the above-described object, an image processing apparatus according to the invention is characterized by an input unit for inputting subject image data created by a digital camera; a storage unit for storing the input subject image data in association with default image data; a standard playback unit for displaying a subject image represented by the input subject image data at a first scaling factor so that whether or not the subject image data is stored in association with default image data can be determined; and a print preview unit for displaying on one screen of the display the whole of a composite image into which the subject image represented by the subject image data and a default image represented by the default image data associated with the subject image data are combined with scaling processing to display the subject image represented by the subject image data on the display at a smaller scaling factor than the first scaling factor.

In the image processing apparatus according to the invention, when the subject image represented by the input subject image data is displayed by the standard playback unit, the subject image represented by the subject image data is displayed on the display at a specific scaling factor (first scaling factor) determined by the image size of the subject image represented by the subject image data and the screen size of the display regardless of whether or not the subject image data is stored in association with default image data. Therefore, according to the image processing apparatus according to the invention, if the configuration is a configuration wherein the subject image represented by the subject image data can be displayed at high speed at the first scaling factor, even if the composite image provided by combining the image represented by the default image data and the image represented by the subject image data are combined has a larger size than the subject image, the subject image recorded in the memory can be checked in a short time. On the other hand, the combining result of the default image and the subject image can be displayed by the print preview unit. When the composite image is displayed by the print preview unit, scaling processing to display the subject image represented by the subject image data on the display at a smaller scaling factor than the first scaling factor is performed so that the whole of the composite image can be displayed on one screen of the display. Therefore, according to the image processing apparatus according to the invention, even if the composite image provided by combining the default image represented by the default image data and the subject image represented by the subject image data are combined has a larger size than the subject image represented by the subject image data, the result of combining the subject image and the default image can be checked on one screen.

Further, the image processing apparatus according to the invention is characterized in that the standard playback unit displays text or a pattern indicating that subject image data is associated with default image data on the display together with the subject image. The subject image data recorded in the nonvolatile memory can be checked in a short time as compared with the case where the default image is displayed for making it possible to recognize that the default image data is associated with the subject image data.

Further, the image processing apparatus according to the invention is characterized in that the standard playback unit combines a part of the default image represented by default image data with the subject image represented by subject image data and displays the combining result on the display. The default image is displayed for making it possible to recognize that the default image data is associated with the subject image data, whereby it is made possible to easily determine whether or not the default image data is associated with the subject image data.

Further, the image processing apparatus according to the invention is characterized further by an automatic switch unit for causing the standard playback unit to display the subject image represented by the subject image data associated with default image data for a predetermined time and then causing the print preview unit to display a composite image. Accordingly, the labor and time for checking the combining result of the subject image and the default image can be lessened.

Further, the image processing apparatus according to the invention is characterized further by an manual switch unit for accepting a switch command when the subject image represented by the subject image data associated with default image data is displayed by the standard playback unit and causing the print preview unit to display a composite image after accepting the switch command. Accordingly, unintended display of the combining result of the subject image and the default image can be prevented.

The functions of the plurality of units according to the invention are provided using hardware resources whose functions are determined by the configuration and hardware resources whose functions are determined by programs in any desired combination. The functions of the plurality of units are not limited to those provided by hardware resources physically independent of each other.

BRIEF DESCRIPTION OF THE DRAWINGS

FIG. 13 is a screen transition drawing according to the second embodiment of the invention.

FIG. 16 is a schematic drawing according to the second embodiment of the invention.

BEST MODE FOR CARRYING OUT THE INVENTION

Embodiments of the invention will be discussed below based on embodiments.

First Embodiment

Figure 2:
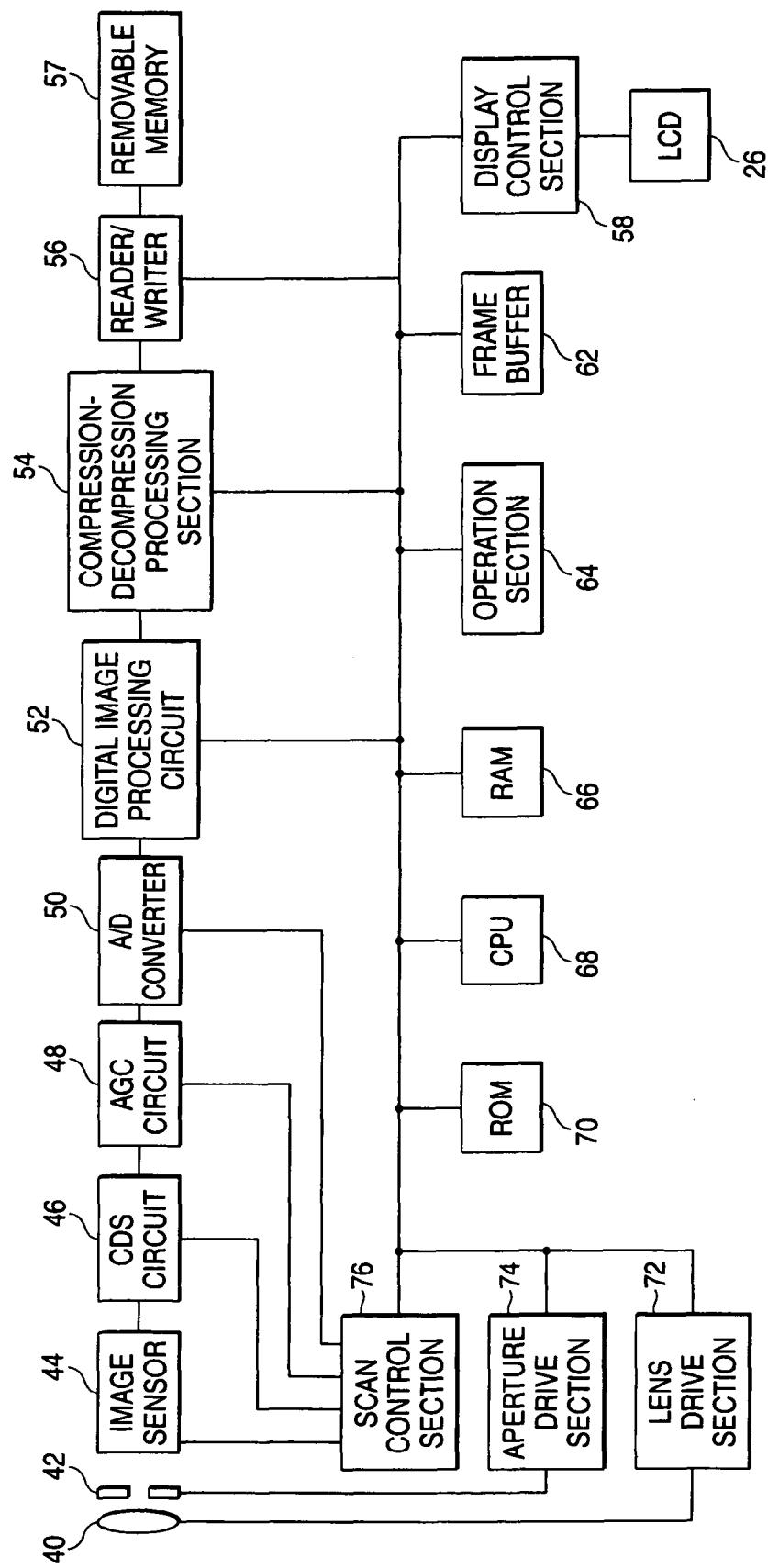
FIG. 2 is a block diagram to show the digital camera according to the first embodiment of the invention.
Figure 3:
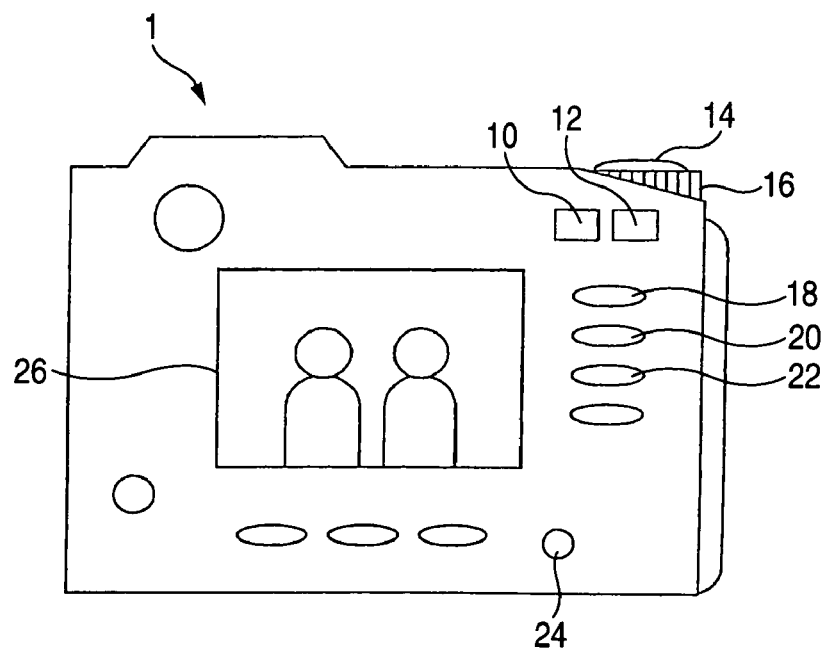
FIG. 3A is a rear view of the digital camera according to the first embodiment of the invention and FIG. 3B is a front view of the digital camera.
Figure 3:
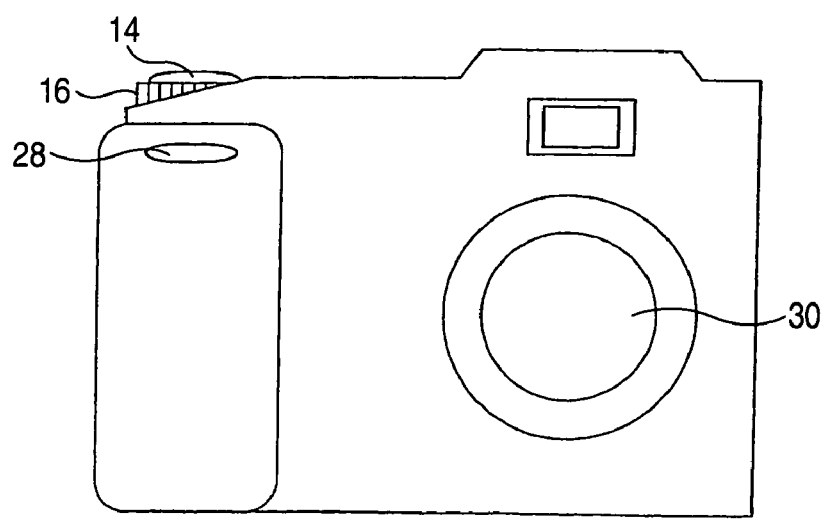

FIG. 2 is a block diagram to show the configuration of a digital camera 1 according to a first embodiment of the invention. FIGS. 3A and 3B are a front view and a rear view to show the appearance of the digital camera 1.

A lens drive section 72 drives a zoom lens 40 so as to form a subject image on the light reception section of an image sensor 44 at the scaling factor responsive to a signal input from a CPU 68. An aperture drive section 74 drives an optical aperture 42 so that the incident light amount on the image sensor 44 becomes the incident light amount responsive to a signal input from the CPU 68.

The image sensor 44 is an area image sensor formed with an on chip color filter array made up of four complementary color filters of C (Cyan), M (Magenta), Y (Yellow), and G (Green) for storing the charges provided by executing photoelectric conversion of received light for a given time and outputting an electric signal responsive to the light reception amount for each photoelectric conversion element. The color filter array may be made up of three complementary color filters of C, M, and Y or may be made up of primary color filters of R (Red), G (green), and B (Blue).

A CDS circuit 46 performs reduction processing of noise contained in the analog electric signal. An AGC circuit 48 performs gain control, thereby adjusting the level of the analog electric signal. An A/D converter 50 quantizes the analog electric signal subjected to the processing described above into a digital signal of a determined gradation. A scan control section 76 outputs a shift pulse, a vertical transfer pulse, a horizontal transfer pulse, etc., to the image sensor 44 and outputs a drive pulse to the CDS circuit 46, the AGC circuit 48, and the A/D converter 50 to operate these components in synchronization with the image sensor 44.

A digital image processing section 52, which is implemented, for example, as a DSP (Digital Signal Processor), performs image generation processing, white balance correction, γ correction, color space conversion, etc., based on the image signal output from the A/D converter 50, creates subject image data representing R, G, and B gradation values, Y, Cb, and Cr gradation values, etc., for example, for each pixel, and stores the subject image data in RAM 66. The image generation processing mentioned here is processing of mainly generating image data having three gradation values for each pixel by interpolation processing using digital data representing the gradation value of any of CMYG corresponding to output of each photoelectric conversion element.

A compression-decompression processing section 54 compresses the subject image data output from the digital image processing section 52 to create compressed image data in conformity with a JPEG format, for example, in a photographing mode and decompresses the compressed image data read from removable memory 57 using a reader/writer 56 and stores the decompressed image data in the RAM 66 in a playback mode. The removable memory 57 implemented as nonvolatile memory such as flash memory can be attached to and detached from the reader/writer 56, and the reader/writer 56 writes data into the removable memory 57 and reads data stored in the removable memory 57. That is, the reader/writer 56 corresponds to an input unit as claimed in claims and the digital camera 1 also corresponds to an image processing apparatus as claimed in claims.

An operation section 64 includes various buttons such as a power button 14 for turning on/off power, a dial switch 16 for setting a mode such as the photographing mode, the playback mode, or a direct print mode, a shutter button 28 for entering a shutter command, a background setting button 18 for setting a background in the photographing mode, zoom buttons 10 and 12 for setting the magnification or scaling factor of a zoom lens, a next selection key 20, a preceding selection key 22, and a determination key 24, and a circuit for detecting the user pressing any button and the rotation angle of the dial switch 16.

A display control section 58 performs processing of thinning out the image data stored in the RAM 66 at a fixed scaling factor in response to the display area of the display, color space conversion processing, combining processing, etc., and drives an LCD (Liquid Crystal Display) 26 as the display based on the display data created by performing the processing. A frame buffer 62 contains a background area and a foreground area for separately storing the image data to be combined. The display control section 58 includes a combining processing circuit for displaying a composite image on the LCD 26 by displaying the pixels of the image data stored in the background area taking precedence over the transparent pixels of the image data stored in the foreground area and displaying the opaque pixels of the image data stored in the foreground area taking precedence over the pixels of the image data stored in the background area.

The CPU 68 controls the whole digital camera 1 by executing a computer program stored in ROM 70. The ROM 70 is memory for storing the computer program, etc., for the CPU 68 to execute various types of control. The RAM 66 is memory for temporarily storing various programs and various pieces of data.

Figure 4:
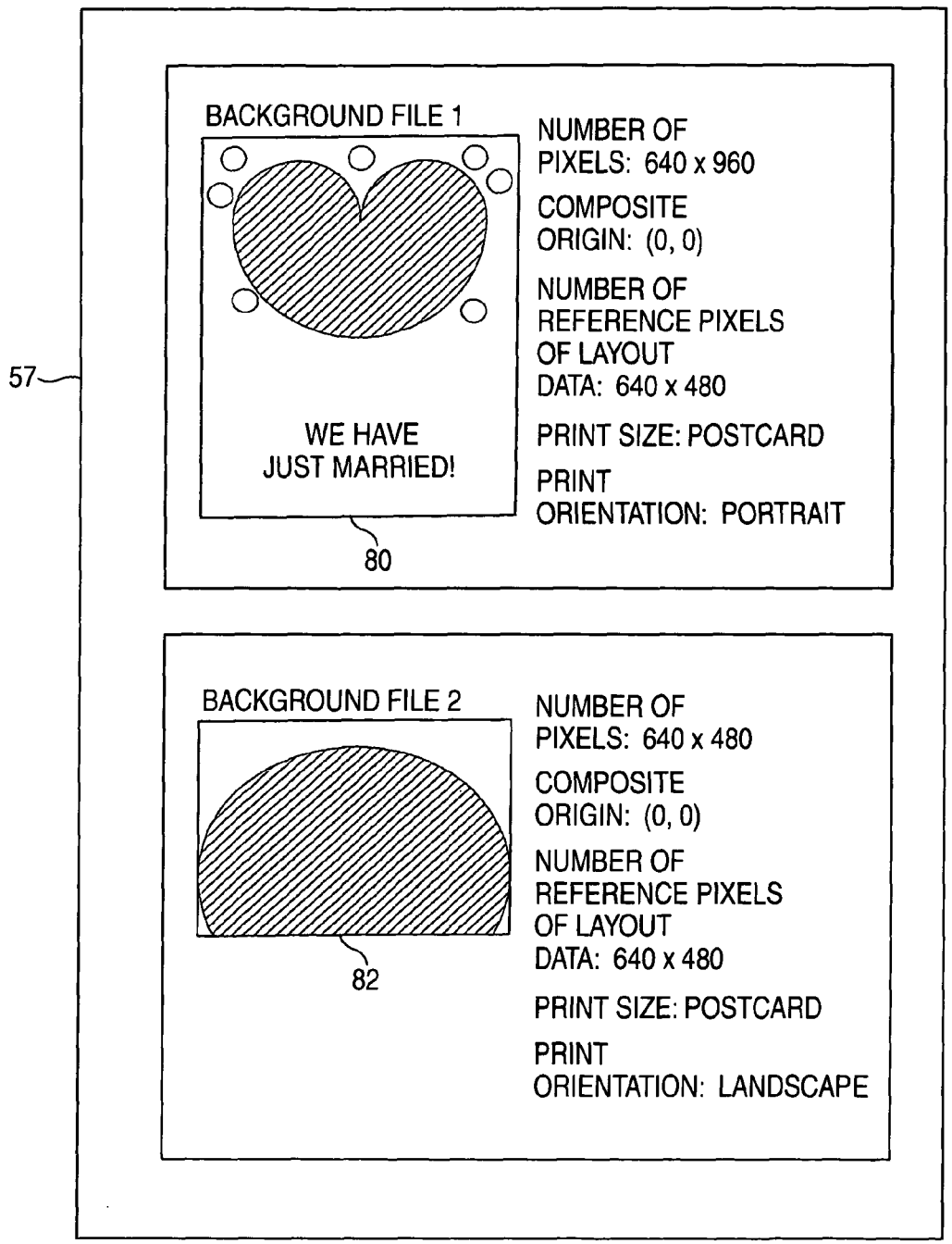
FIG. 4 is a schematic drawing to show background files according to the first embodiment of the invention.

The configuration of the digital camera 1 has been described. Next, default image data will be discussed. FIG. 4 is a schematic drawing to show background files recorded in the removable memory 57.

The background file, which is provided for creating printed matter of a greeting card with a photo, a photo seal, etc., is transferred from a personal computer, etc., and is previously stored in the ROM 70 or the removable memory 57. In the description that follows, it is assumed that the background files are stored in the removable memory 57. The default image data stored in the background file represents an image 80, 82 as a default image made up of a line drawing, fills, text, etc. The hatched area is an area into which the image represented by subject image data is fitted (transparent area). As the gradation value of each pixel in the transparent area, a predetermined value representing transparency, such as R=00H, G=00H, B=00H, for example, is set. The default images include a large default image wherein the image represented by subject image data is laid out in a part and a small default image wherein the image represented by subject image data is laid out on the whole. More specifically, when the whole of the subject image and the whole of the default image overlap, if the whole of the default image is larger than the whole of the subject image, the default image is a large default image; if the whole of the default image is equal to or smaller than the whole of the subject image, the default image is a small default image.

The image represented by large default image data is, for example, like the image 80, and the image represented by small default image data is, for example, like the image 82. The number of pixels of the large default image data representing the image 80 becomes 640×960 pixels at the combining processing time with respect to the subject image data of 640×480 pixels, for example. The number of pixels of the small default image data representing the image 82 becomes 640×480 pixels at the combining processing time with respect to the subject image data of 640×480 pixels, for example. The numbers of the pixels of the large default image data and the small default image data are not limited to the illustrated numbers of pixels, and the number of pixels of the large default image data may be 1600×1200 pixels with respect to the subject image data of 640×480 pixels, for example. In a state in which the default image data is stored in the removable memory 57, the image size of the default image data need not correspond to the image size of the subject image data, because the image size of the default image data can be converted into the number of pixels responsive to the image size of the subject image data by thinning out or interpolation at the combining processing time.

The background file is made up of data indicating the number of pixels of the default image data, the coordinates with which the origin coordinates of the subject image data are matched (coordinates of composite origin), the number of reference pixels of layout data, the print size, the print orientation of the default image data (portrait, landscape), etc., in addition to the default image data. At the combining processing time before print, a comparison is made between the number of reference pixels of layout data and the number of pixels of the subject image data to be laid out, the default image data is thinned out or interpolated to the size responsive to the number of pixels of the subject image data to be laid out, and the coordinates of the composite origin are converted accordingly. A comparison is made between the number of reference pixels of layout data and the number of pixels of the subject image data to be laid out, whereby the subject image data may be thinned out or interpolated before combining processing.

For example, if the number of pixels of the default image data is (1280×640), the coordinates of the composite origin are (20, 20), the number of reference pixels of layout data is (640×480), and the number of pixels of the subject image data is (1280×960), the number of pixels of the subject image data is twice the number of reference pixels in both horizontal and vertical directions and thus the combining processing before print is performed as follows: The default image data is interpolated to set the number of pixels of the default image data to (2560×1280), the coordinates of the composite origin are converted into (40, 40), and the default image and the subject image are combined so that the image represented by the subject image data overlaps in the range of (40, 40) to (1320, 1000) of the image represented by the default image data after conversion. At the print tine, further interpolation processing, thinning-out processing, or rotation processing is performed based on the print size, the print orientation of the default image data, etc., previously stored in the background file, and a composite image of the setup print size and in the setup print orientation is printed on a printer.

If the subject image data is always recorded with the given number of pixels, one default image data may be recorded for one picture. When there are different numbers of pixels of the subject image data, a plurality of pieces of default image data different in the number of pixels may be recorded for one picture in response to the number of pixels of the subject image data or only one default image data may be recorded for one picture on the precondition that the data is scaled up or down before combining in response to the number of pixels of the subject image data. In the description that follows, it is assumed that the subject image data is always recorded with 640×480 pixels and that the number of reference pixels of layout data set in the default image data is always 640×480 pixels. The subject image data may be data recorded as essential image data or may be data recorded as thumbnail image data.

If the subject image and the default image are combined into a composite image in a personal computer or a standalone printer and then the composite image is printed and it is not assumed that the digital camera 1 and a printer are directly connected for printing, the true default image data used to create composite image data for print may be previously stored in the personal computer or the standalone printer and display processing in the digital camera 1 may be executed using data with a coarse gradation at a lower resolution than that of the true default image data. In doing so, the default image data does not put pressure on the memory space of the digital camera 1 and the default image data can be processed at high speed.

Figure 5:
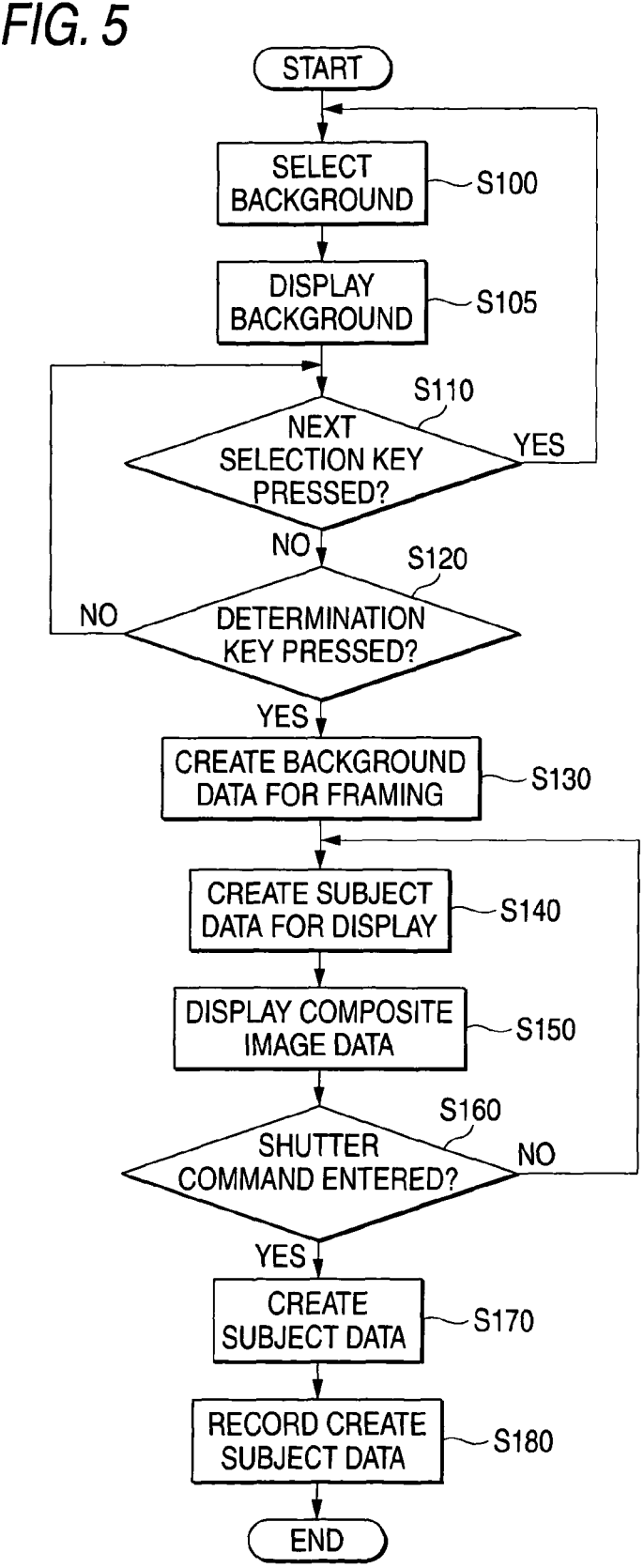
FIG. 5 is a flowchart according to the first embodiment of the invention.

The default image data has been described. Next, the operation of the digital camera 1 will be discussed. FIG. 5 is a flowchart to show a processing flow for storing subject image data in the removable memory 57 in association with default image data. The sequence shown in FIG. 5 is started as an operator presses the background setting button 18 in the photographing mode determined by the rotation angle of the dial switch 16.

At step S100, any one of the background files stored in the removable memory 57 is selected. At step S105, the default image data stored in the selected background file is displayed as follows: First, the default image data is read by the reader/writer 56 from the removable memory 57 and is decompressed by the compression-decompression processing section 54 for storage in the RAM 66. In the description, it is assumed that the default image data is previously compressed for record, but the default image data may be recorded in a non-compression state. Next, the default image data is scaled down in response to the number of pixels of the display area of the LCD 26 and is rotated as required. If the number of pixels of the display area is 320×240 pixels and the default image data has 640×960 pixels in portrait orientation, the default image data is thinned out so that the numbers of vertical and horizontal pixels become a third, and the default image data is rotated 90° to create the default image data of 320×213 pixels. It is desirable that the processing should be performed by a program executed in the CPU 68 to simplify the hardware and to deal with default image data of any number of pixels. The default image data edited for display is stored in the frame buffer 62 and then is displayed as the display control section 58 drives the LCD 26 based on it. At step S110, when the next selection key 20 is pressed, the process returns to step S100 and another background file is selected and the above-described processing is repeated.

Figure 6:
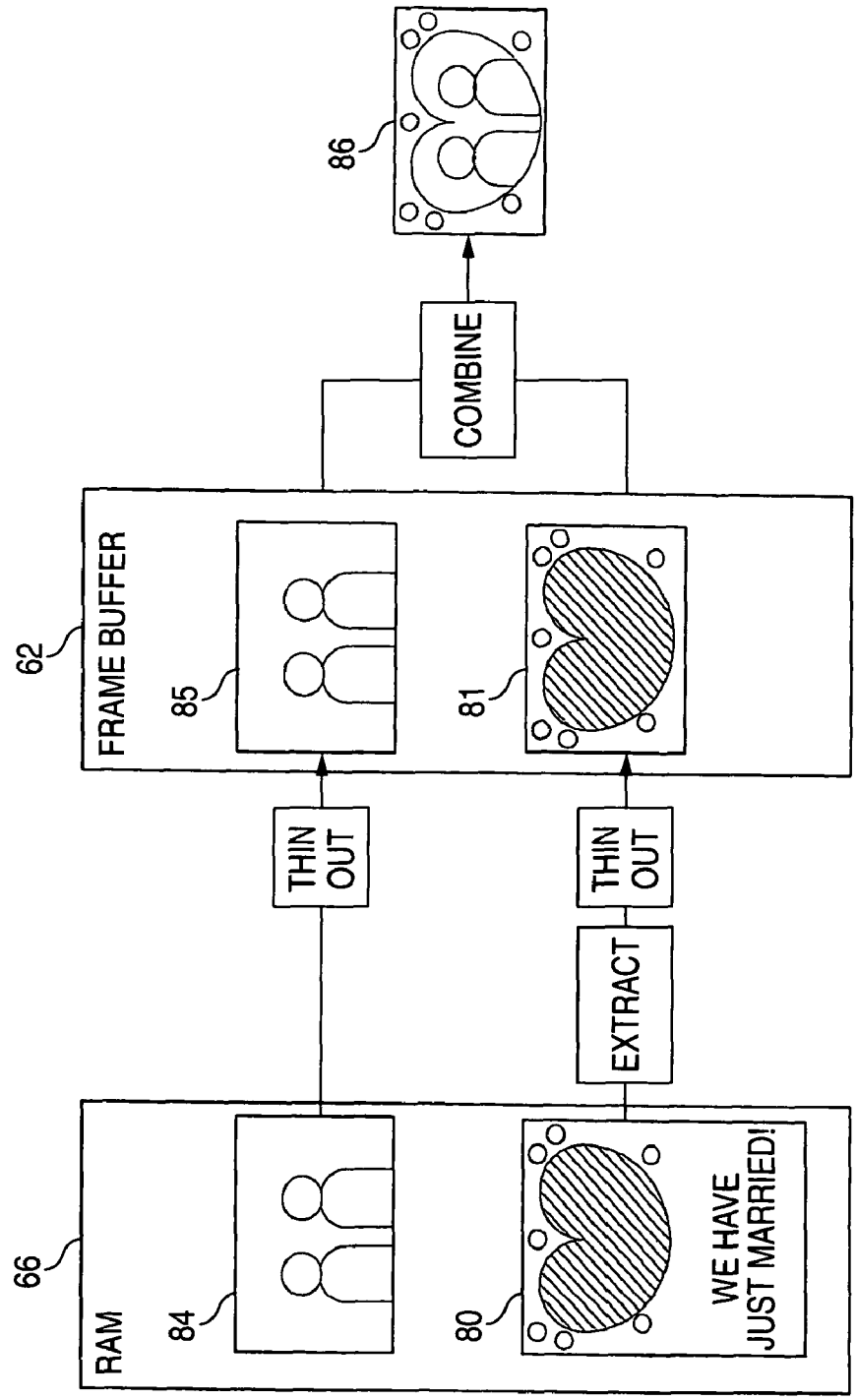
FIG. 6 is a schematic drawing according to the first embodiment of the invention.

When the determination key 24 is pressed at step S120, at step S130, a part of the default image data 80 stored in the RAM 66 at step S105 is stored in the foreground area of the frame buffer 62, as shown in FIG. 6. Specifically, an area of the same number of pixels as subject image data 84 with the coordinates of the composite origin described above becoming the origin (upper left corner) is extracted from the default image data 80 and thinning out is performed in response to the number of pixels of the display area and rotation is performed as required to create (default image data for framing 81), which is then stored in the foreground area of the frame buffer 62. That is, only the portion overlapping with the subject image data is extracted from the default image data and is stored in the foreground area of the frame buffer 62. It is desirable that the processing should be performed by a program executed in the CPU 68 to simplify the hardware and to deal with default image data of any number of pixels.

S140 and S150 described below are repeated in the time period until the shutter button 28 is pressed, whereby the subject image is displayed as a moving image in the transparent area of the image represented by the default image data. At step S140, a predetermined control signal is input to the scan control section 76, the charges accumulated in the image sensor 44 for a predetermined time are scanned, the subject image data 84 created in the digital image processing section 52 is stored in the RAM 66 as shown in FIG. 6, and the subject image data 84 is thinned out in response to the number of pixels of the display area to create (subject image data for display 85), which is then stored in the background area of the frame buffer 62. The thinning-out processing performed here is processing performed for all subject image data regardless of whether the subject image data is subject image data representing the subject image combined with the default image or subject image data representing the subject image not combined with the default image and therefore it is desirable that high speed processing should be performed using hardware dedicatedly designed so as to be able to produce smooth moving image display. If scaling-down processing of the subject image data in response to the display area of the LCD 26 is performed at high speed by dedicatedly designed hardware, the subject image can be displayed smoothly as a moving image in the transparent area of the image represented by the default image data.

Figure 1:
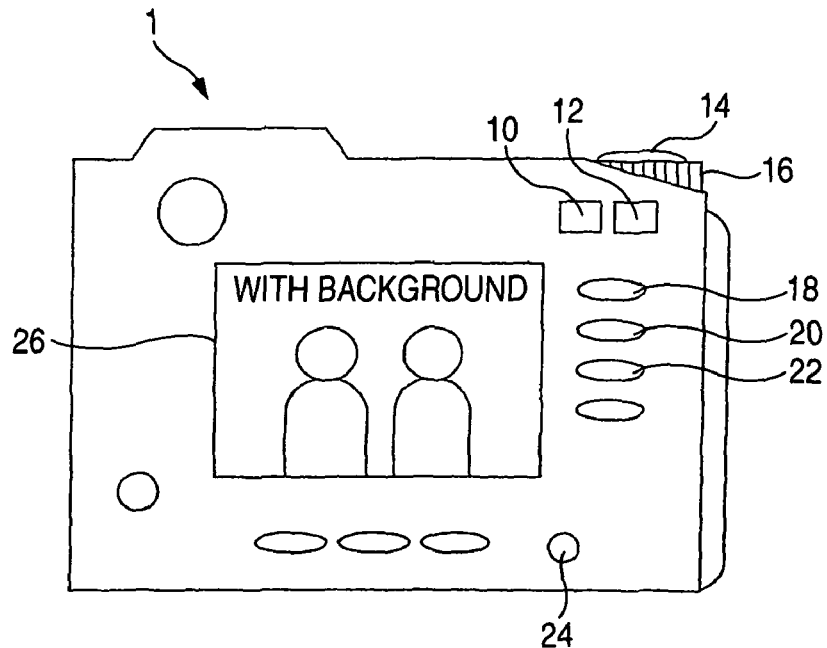
FIG. 1 is rear views to show a digital camera according to a first embodiment of the invention; (A) shows a state of a standard playback mode and (B) shows a state of a print preview mode.
Figure 1:
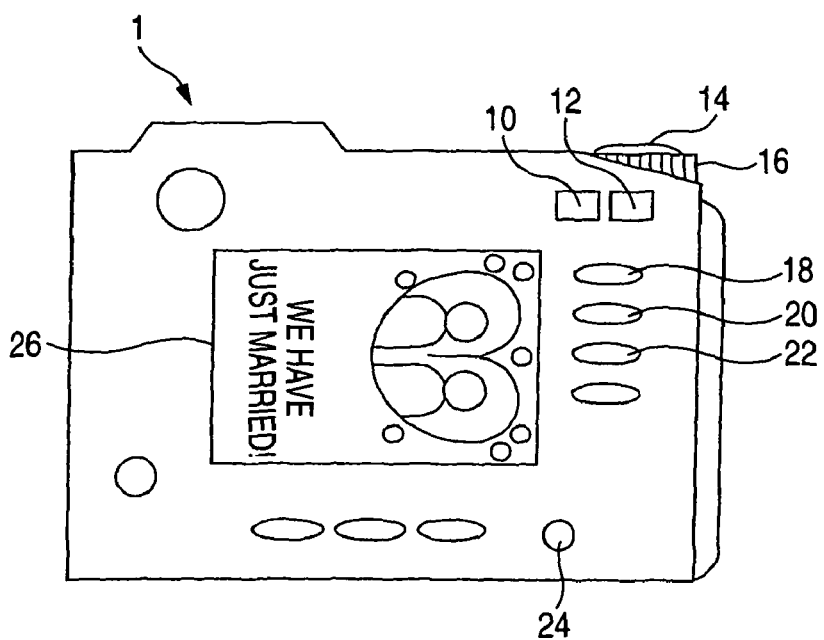

At step S50, the display control section 58 combines the subject image data for display 85 and the default image data for framing 81 stored in the frame buffer 62 and outputs a drive signal to the LCD 26, whereby a composite image for framing is displayed as shown in FIG. 1(A). Specifically, the default image data for framing 81 stored in the frame buffer 62 is scanned preferentially and if the gradation value of the attention pixel of the default image data for framing 81 is the gradation value previously assigned to a transparent color (for example, R=00H, G=00H, B=00H described above), a drive signal is output to the LCD 26 based on the gradation value of the attention pixel of the subject image data for display 85; otherwise, a drive signal is output to the LCD 26 based on the gradation value of the attention pixel of the default image data for framing 81. At this time, the data selected as the source of the drive signal output to the LCD 26 is composite image data for framing 86.

At step S160, whether or not a shutter command is entered, namely, whether or not the shutter button 28 is pressed is detected. If the shutter button 28 being pressed is not detected, the process returns to step S130 and the above-described processing is repeated. If the shutter button 28 being pressed is detected at step S160, the process goes to step S170.

At step S170, as at step S130, a predetermined control signal is input to the scan control section 76, the charges accumulated in the image sensor 44 for a predetermined time are scanned, and subject image data is created in the digital image processing section 52 and is stored in the RAM 66.

At step S180, the subject image data stored in the RAM 66 is compressed by the compression-decompression processing section 54 to create compressed image data, which is then stored in the removable memory 57 by the reader/writer 56. At step S180, data to associate the subject image data recorded at this time and the background file selected as the determination key 24 is pressed at step S110 with each other is also stored in the removable memory 57. The data representing the composite image into which the image represented by the default image data and the image represented by the subject image data are combined is not stored in the removable memory 57 and the subject image data is stored in the removable memory 57 as it is, so that it is possible to change, cancel, etc., the background after photographing.

Figure 7:
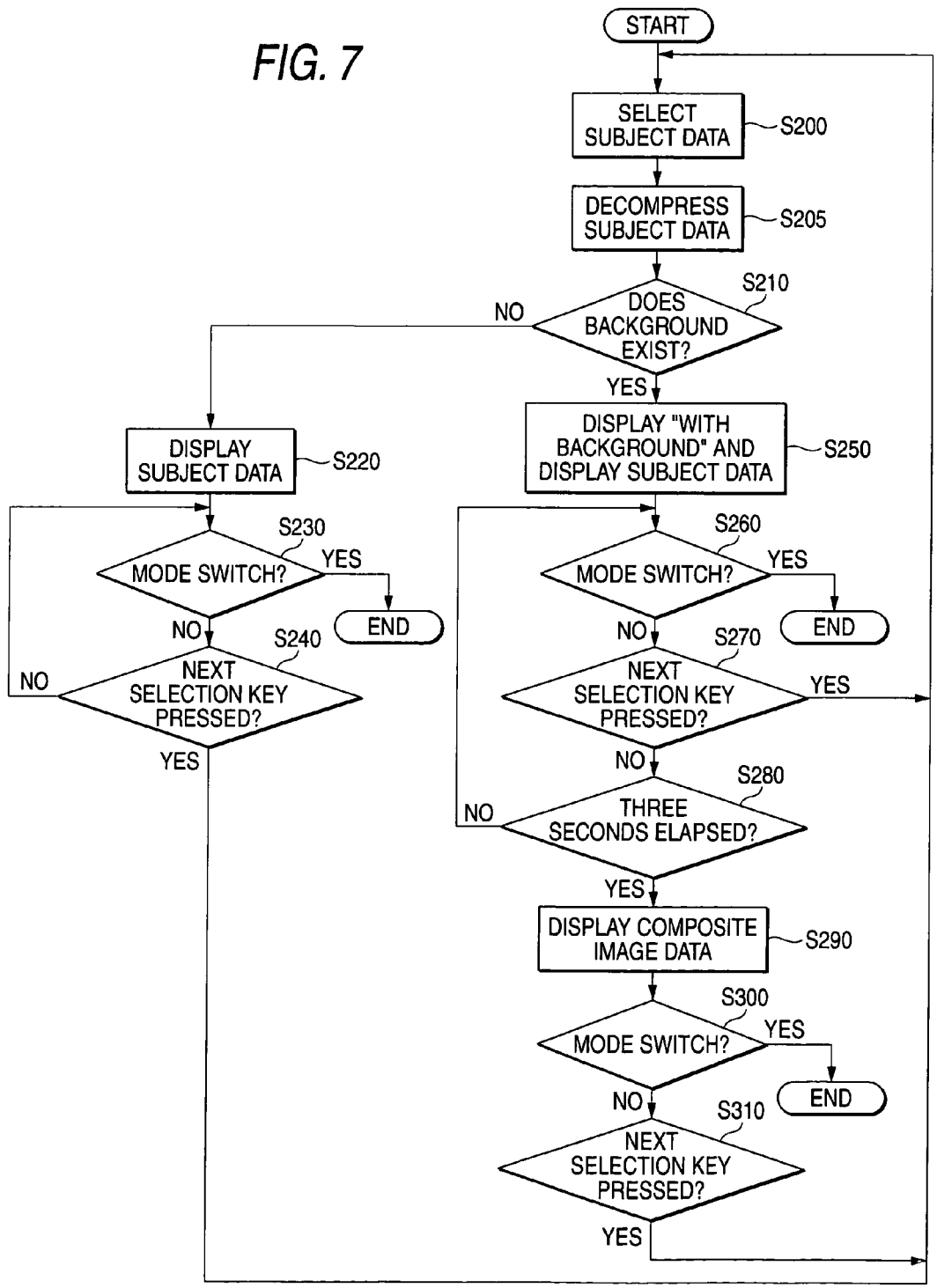
FIG. 7 is a flowchart according to the first embodiment of the invention.

The processing flow for storing the subject image data in the removable memory 57 has been described. Next, playback processing of the subject image data stored in the removable memory 57 will be discussed. FIG. 7 is a flowchart to show a flow of the playback processing of the subject image data stored in the removable memory 57. The sequence shown in FIG. 7 is started as the rotation angle of the dial switch 16 corresponding to the playback mode is detected in the operation section 64.

At step S200, any one piece of the subject image data stored in the removable memory 57 is selected. At step S205, the selected subject image data is read by the reader/writer 56 from the removable memory 57 and is decompressed by the compression-decompression processing section for storage in the RAM 66. In the description, it is assumed that the subject image data is previously compressed for record, but the subject image data may be recorded in a non-compression state. At step S210, whether or not a background file is associated with the selected subject image data is determined. If no background file is associated, the process goes to step S220 and later and the subject image represented by the subject image data is displayed singly; if a background file is associated, the process goes to step S250 and later.

Figure 8:
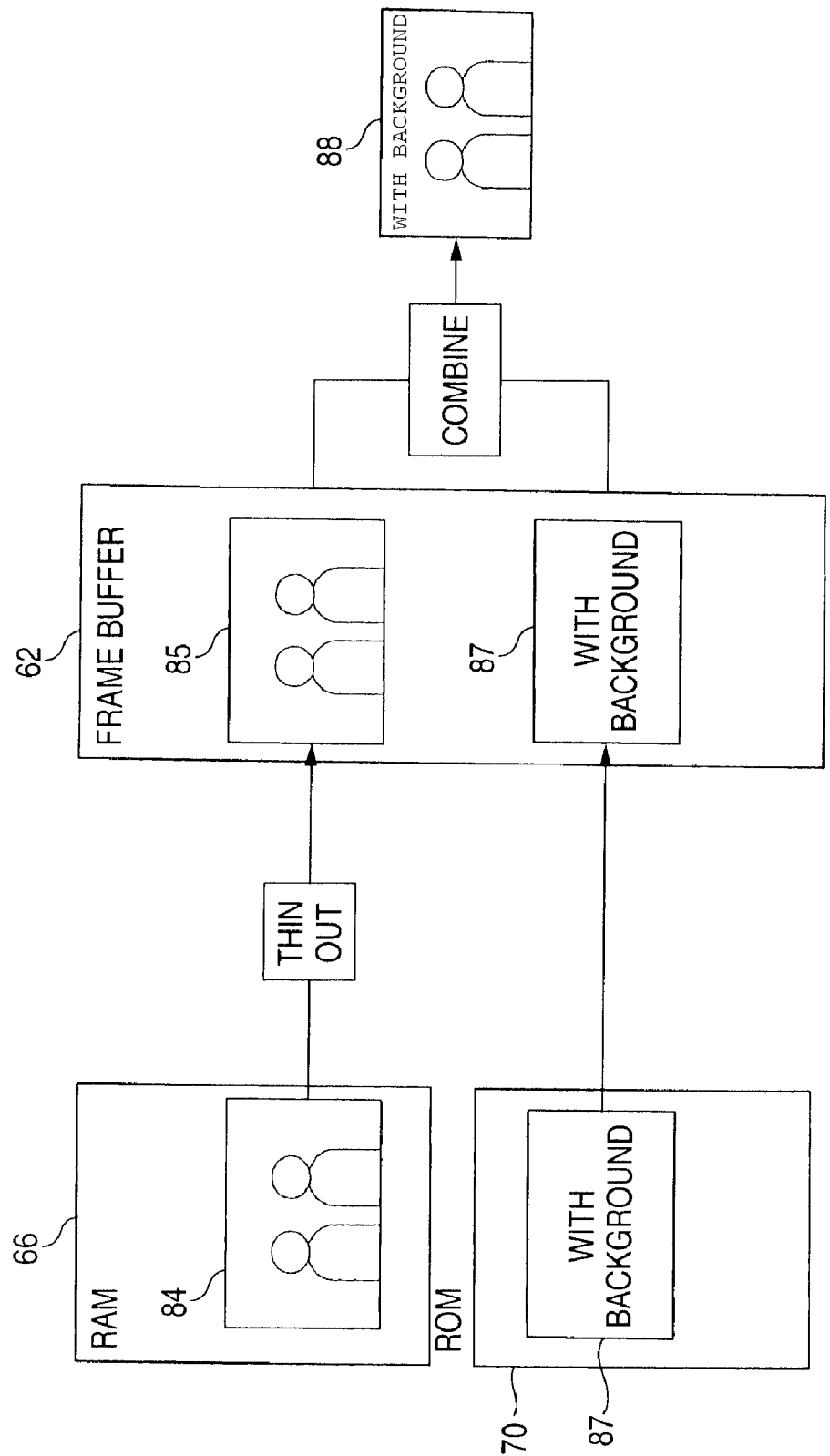
FIG. 8 is a schematic drawing according to the first embodiment of the invention.

At step S250, the subject image represented by the subject image data selected at step S200 is displayed on the LCD 26 together with a pattern of text, an icon, etc., indicating association with the default image data, as shown in FIG. 1(A). In FIG. 1(A), a character string of "WITH BACKGROUND" is superposed on the foreground of the subject image on the display, whereby it can be recognized that the subject image data selected at step S200 is associated with the default image data. Specifically, as shown in FIG. 8, the subject image data 84 stored in the RAM 66 is thinned out by the display control section 58 in response to the number of pixels of the display area to create subject image data for display 85, the subject image data for display 85 is stored in the background area of the frame buffer 62, and bit map data 87 representing the character string "WITH BACKGROUND" previously stored in the ROM 70 is stored in the foreground area of the frame buffer 62. The thinning-out processing of the subject image data is processing performed for all subject image data regardless of whether the subject image data is subject image data representing the subject image combined with the default image or subject image data representing the subject image not combined with the default image and therefore it is desirable that high-speed processing should be performed using hardware dedicatedly designed so as to be able to produce high-speed display. The thinning-out processing performed here is not required if the subject image data for display 85 of as many pixels as the number of pixels of the display area is recorded in the removable buffer 57 as thumbnail image data together with essential image data by thinning-out processing just after photographing. Next, the display control section 58 combines the subject image data for display 85 and the bit map data 87 representing "WITH BACKGROUND" stored in the frame buffer 62 and outputs a drive signal to the LCD 26, whereby the character string "WITH BACKGROUND" is superposed on the foreground of the image represented by the subject image data for display 85 on the display as shown in FIG. 1(A). At this time, the data selected as the source of the drive signal output to the LCD 26 is composite image data for high-speed playback 88.

At step S250, it may be made possible to recognize that the subject image data selected at step S200 is associated with the default image data by combining a part of the Image represented by the default image data with the subject image and displaying the composite image as shown in FIG. 6. Accordingly, it becomes easier for the operator to understand the fact that the default image data is associated with the displayed subject image data.

At step S260, whether or not a mode switch command is entered, namely, whether or not the rotation angle of the dial switch 16 is changed is detected. If a mode switch command is entered within three seconds after display of the subject image at step S250, the playback mode is terminated and is switched into another mode. If a mode switch command is not entered, whether or not the next selection key 20 is pressed is detected at step S270. If the next selection key 20 is pressed within three seconds after display of the subject image at step S250, the process returns to step S200 and another piece of subject image data is selected and the above-described processing is repeated. At step S280, whether or not a state in which a mode switch command is not entered and the next selection key 20 is not pressed has continued for three seconds is determined with a timer (not shown). If the state has continued for three seconds, the process goes to step S290 and a transition is made to a print preview mode. The state in which steps S290, S300, and S310 are executed is called print preview mode, and the state in which steps S200 to S280 are executed is called standard playback mode.

At step S280, instead of determining whether or not the state in which a mode switch command is not entered and the next selection key 20 is not pressed has continued for three seconds, for example, whether or not a button such as the determination key 24 is pressed may be determined and if the button is pressed, the process may go to step S290 and a transition may be made to the print preview mode; if the button is not pressed, the process may return to step S260. To automatically switch the mode when a predetermined time has elapsed, the labor for switching the mode can be lessened; to manually switch the mode, unintended display of the combining result of the subject image and the default image can be prevented.

Figure 9:
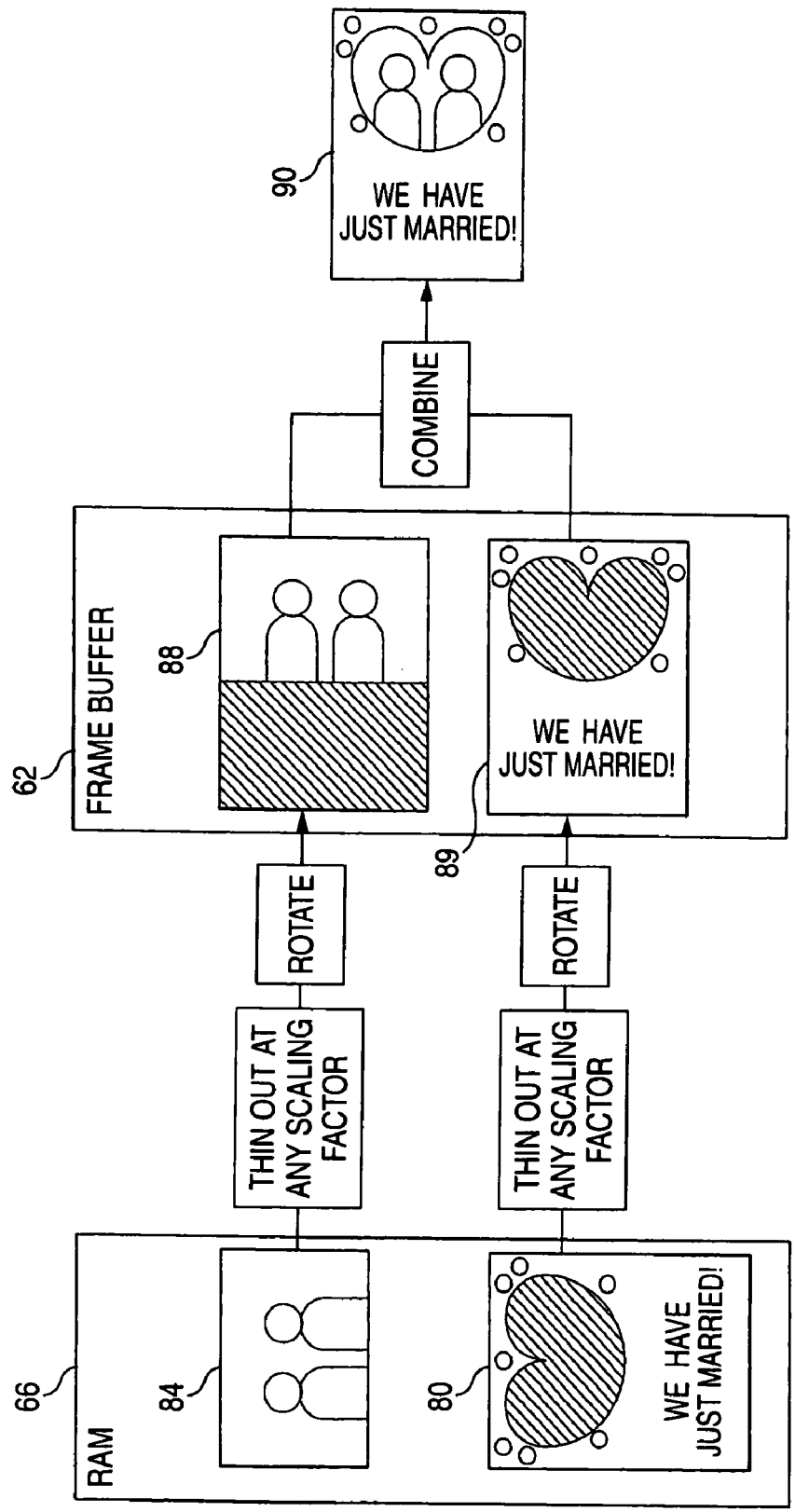
FIG. 9 is a schematic drawing according to the first embodiment of the invention.

At step S290, the image represented by the subject image data selected at step S200 and the image represented by the default image data associated with the subject image data are displayed as a composite image as shown in FIG. 9. First, default image data for print preview 89 is created from the default image data 80 stored in the background file associated with the subject image data selected at step S200. Specifically, first, default image data is read from the removable memory 57 by the reader/writer 56 and is decompressed by the compression-decompression processing section 54 and the default image data 80 is stored in the RAM 66 as shown in FIG. 9. Next, to display the whole of the default image data 80 having a larger number of pixels than the display area on one screen, scaling-down processing responsive to the number of pixels of the default image data 80 and rotation processing as required are performed. For example, assuming that the number of pixels of the display area is 320×240 pixels and the default image data 80 has 640×960 pixels in portrait orientation, the default image data 80 is thinned out so that the numbers of vertical and horizontal pixels become a third, and the default image data 80 is rotated 90° to create the default image data for print preview 89 of 320×213 pixels, which is then stored in the foreground area of the frame buffer 62. It is desirable that the processing should be performed by a program executed in the CPU 68 to simplify the hardware and to set any desired scaling factor of the thinning-out processing corresponding to default image data of any number of pixels.

Next, the subject image data 84 stored in the RAM 66 is thinned out in response to information of the subject image data stored in the background file (the number of pixels of the default image data, the coordinates of the composite origin, the number of reference pixels of layout data, etc.,) and the number of pixels of the display area and is rotated and is moved in parallel by executing coordinate conversion to create subject image data for print preview 85. At this time, if large default image data wherein the image represented by the subject image data is laid out in a part is applied, namely, if the number of pixels of the default image data 80 is larger than the number of reference pixels of layout data, the scaling factor in the thinning-out processing performed at step S290 in the playback mode becomes smaller than that in the thinning-out processing performed at step S220 and step S250 in the standard playback mode. For example, as shown in FIG. 9, to combine the subject image data in portrait orientation with the default image data for print preview 89, the subject image data 84 stored in the RAM 66 in landscape orientation is rotated 90° clockwise. For example, the coordinates of the subject image data 85 are converted in response to coordinate conversion executed by the thinning-out processing and the rotation processing performed for the default image data. In the example shown in FIG. 9, as step S205 is executed, subject image data for print preview 85 of 160×213 pixels in portrait orientation is created from the subject image data 84 of 640× 480 pixels in landscape orientation stored in the RAM 66, the subject image data for print preview 85 is stored in the area corresponding to the right of the screen in the foreground area of the frame buffer 62, and the value indicating transparency is stored in the area corresponding to the left of the screen.

Next, the display control section 58 combines the subject image data for print preview 85 and the default image data for print preview 89 stored in the frame buffer 62 and outputs a drive signal to the LCD 26, whereby the whole of a composite image for print preview is displayed on one screen as shown in FIG. 1(B). Specifically, the default image data for print preview 89 stored in the frame buffer 62 is scanned preferentially and if the gradation value of the attention pixel of the default image data for print preview 89 is the gradation value previously assigned to a transparent color (for example, R=00H, G=00H, B=00H described above), a drive signal is output to the LCD 26 based on the gradation value of the attention pixel of the subject image data for print preview 85; otherwise, a drive signal is output to the LCD 26 based on the gradation value of the attention pixel of the default image data for print preview 89. At this time, the data selected as the source of the drive signal output to the LCD 26 is composite image data for print preview 90, and corresponds to composite image data as claimed in claims. It is desirable that the above-described processing of creating the subject image data for print preview 85 and the default image data for print preview 89 should be performed by a program executed in the CPU 68 to simplify the hardware and to set any desired scaling factor of the thinning-out processing corresponding to default image data of any number of pixels.

On the other hand, at step 3220, the subject image represented by the subject image data with which no background file is associated is displayed as follows; The display control section 58 thins out the subject image data in response to the number of pixels of the display area of the LCD 26 for storage in the frame buffer 62. Assuming that the number of pixels of the display area is 320×240 pixels and the subject image data has 640×480 pixels, the subject image data is thinned out so that the numbers of vertical and horizontal pixels become a half, and the subject image data is stored in the frame buffer 62. The thinning-out processing performed here is not required if the thumbnail image data of as many pixels as the number of pixels of the display area is recorded in the removable buffer 57 together with essential image data by thinning-out processing just after photographing. The subject image data stored in the frame buffer 62 is displayed as shown in FIG. 3(A) as the display control section 58 drives the LCD 26 based on the subject image data.

At step S230, whether or not a mode switch command is entered, namely, whether or not the rotation angle of the dial switch 16 is changed is detected. If a mode switch command is entered, the playback mode is terminated and is switched into another mode. If a mode switch command is not entered, a mode switch command and the next selection key 20 being pressed are detected repeatedly in the time period until the next selection key 20 being pressed is detected at step S240. If the next selection key 20 being pressed is detected at step S240, the process returns to step S200 and another piece of subject image data is selected and the above-described processing is repeated.

In the first embodiment of the invention, an image processing unit as claimed in claims is made up of the CDS circuit 46, the AGC circuit 48, the A/D converter 50, the digital image processing section 52, etc., and the function is realized as step S140 and step S170 are executed. A setting unit as claimed in claims is made up of the background setting button 18, the next selection key 20, the preceding selection key 22, the determination key 24, etc., and the function is realized as steps S100, S105, S110, and S120 are executed. A record unit as claimed in claims is made up of the CPU 68, the compression-decompression processing section 54, the reader/writer 56, etc., and the function is realized as step S180 is executed. A standard playback unit as claimed in claims is made up of the display control section 58, the frame buffer 62, etc., and the function is realized as step S220 and step S250 are executed. Scaling processing as claimed in claims corresponds to processing at step S290. A print preview unit as claimed in claims is made up of the CPU 68, the display control section 5B, the frame buffer 62, etc., and the function is realized as step S290 is executed. An automatic switch unit as claimed in claims is made up of the CPU 68, the timer, etc., and the function is realized as step S280 and the like are executed. An automatic switch unit as claimed in claims is made up of the CPU 68, the determination key 24, etc., and the function is realized as whether or not the determination key 24 is pressed is determined at step S280.

In the first embodiment of the invention described above, in the playback mode, the subject image data associated with the default image and the subject image data not associated with the default image data are displayed on the LCD 26 at the same scaling factor if they are the same in the number of pixels unless a transition to the print preview mode is made as the condition of a lapse of three seconds of the display time, etc., holds. Therefore, if the display control section 58, etc., is configured so as to fast display the subject image represented by the subject image data of a fixed size created by the digital image processing section 52, even if the default image data differs from the subject image data in image size, the operator can check the subject images represented by all subject image data stored in the removable memory 57 in a short time. In the standard playback mode, it is made possible for the operator to recognize that default image data is associated with subject image data by superposing the bit map data of text or an icon previously stored in the ROM 70 on the subject image on the display. Thus, even the subject image data associated with default image data can be displayed on the screen almost at the same speed as the subject image data not associated with any default image data.

On the other hand, if a transition is made from the standard playback mode to the print preview mode as the condition of a lapse of three seconds of the display time of the subject image data associated with default image data, etc., holds, thinning-out processing, rotation processing, etc., responsive to each default image data is performed and the whole of the composite image data for print preview 90 is displayed on one screen of the LCD 26. Thus, even if the image size of the default image data differs from that of the subject image data, the operator can check the result of combining the subject image and the default image.

Second Embodiment

Figure 10:
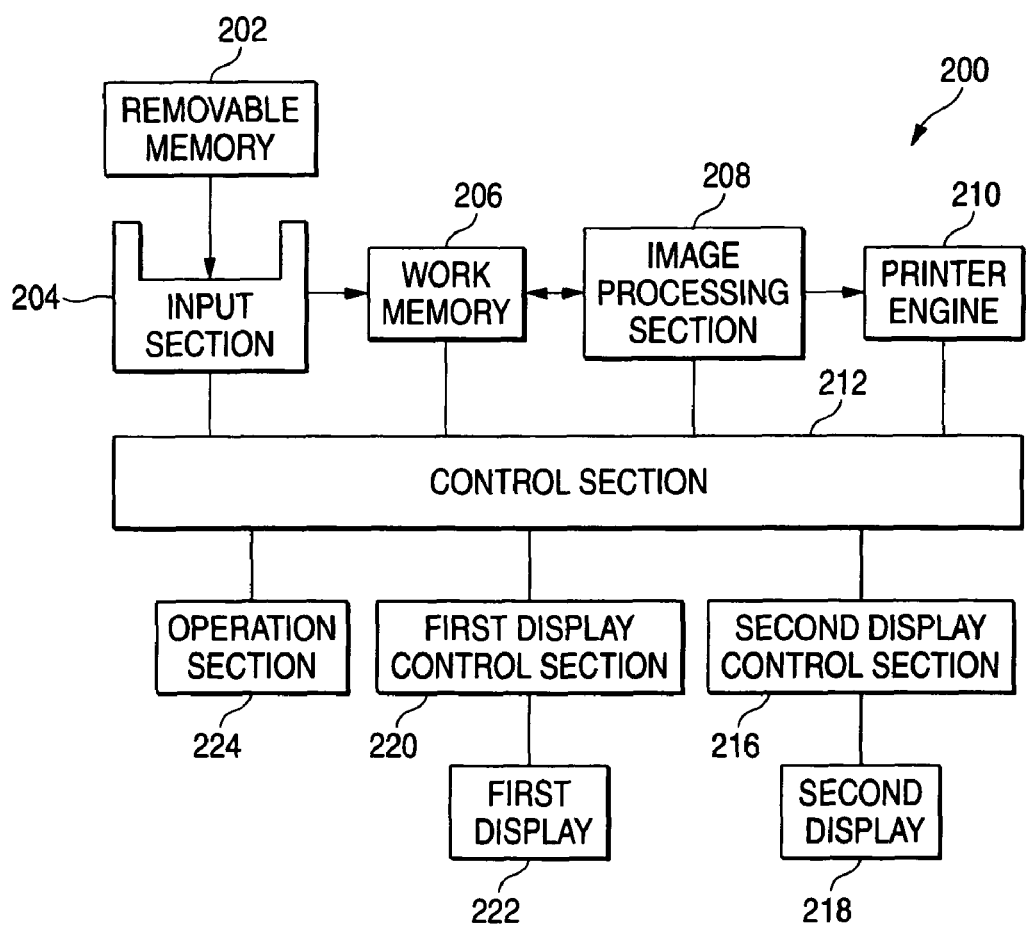
FIG. 10 is a block diagram to show a printer according to a second embodiment of the invention.

FIG. 10 is a block diagram to show a printer 200 according to a second embodiment of the invention. The printer 200 is a standalone printer to which image data can be input from removable memory 202.

A first display 222 is a display for displaying a menu. The first display 222 is implemented as a monochrome LCD, etc. A first display control section 220 includes VRAM, a drive circuit, etc.

A second display 218 is a display for checking image data stored in the removable memory 202. The second display 218 is implemented as a full-color LCD, etc. A second display control section 216 includes VRAM, a drive circuit, etc., and displays image data to be displayed, generated by a control section 212 on the second display 218. The second display 218 and the second display control section 216 are configured so as to be able to fast display the whole of thumbnail image data conforming to Exif on one screen. Specifically, for example, the image size of the thumbnail image data conforming to Exif and the screen size match.

An operation section 224 is provided with a plurality of switches. The operation section 224 accepts operation of selecting the print paper size and the subject image to be printed, starting, canceling print, etc.

An input section 204 as an input unit as claimed in claims reads an image file stored in the removable memory 202 and stores the read image file in work memory 206. The removable memory 202 is a record medium that can be attached to and detached from the input section 204; specifically it is card-type IC memory that can be attached to and detached from a digital camera, for example.

The control section 212 includes a CPU and ROM (not shown). The CPU executes a program stored in the ROM for controlling the whole of the printer 200. Based on image data and a layout definition file stored in the work memory 206, the control section 212 also generates image data to be printed, processed in an image processing section 208 and generates image data to be displayed, processed in the second display control section 216. The program and various pieces of data in the layout definition file, etc., may be downloaded through a network from a predetermined server or may be read from a computer-readable storage medium such as removable memory.

The image processing section 208 is an ASIC for executing processing to convert the image data to be printed, stored in the work memory 206 into print data in cooperation with the control section 212. Specifically, for example, the image processing section 208 executes color space conversion processing, resolution conversion processing, halftone processing, interlace processing, etc., for the image data to be printed, stored in the work memory 206.

A printer engine 210 prints an image on print paper based on the print data generated in the image processing section 208. The printer engine 210 forms an image on print paper according to an ink jet system, a laser system, a sublimation dye transfer printing system, a dot impact system, etc., for example.

Figure 11:
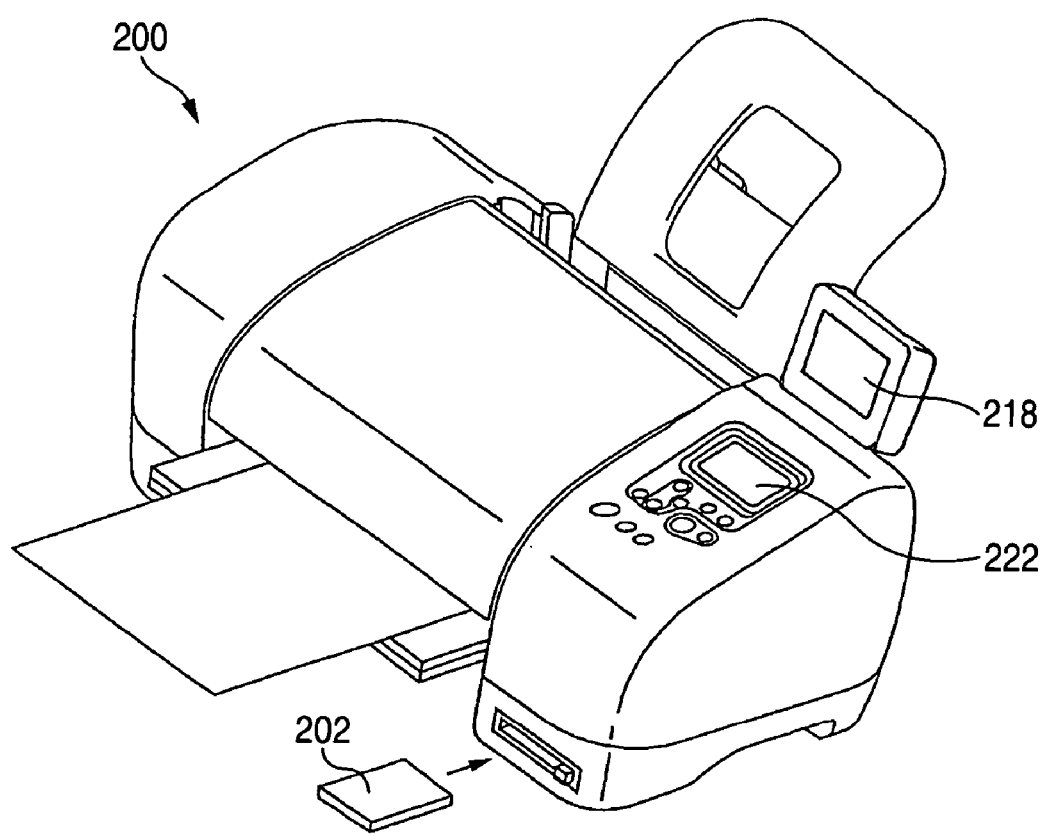
FIG. 11 is a perspective view to show the printer according to the second embodiment of the invention.
Figure 12:
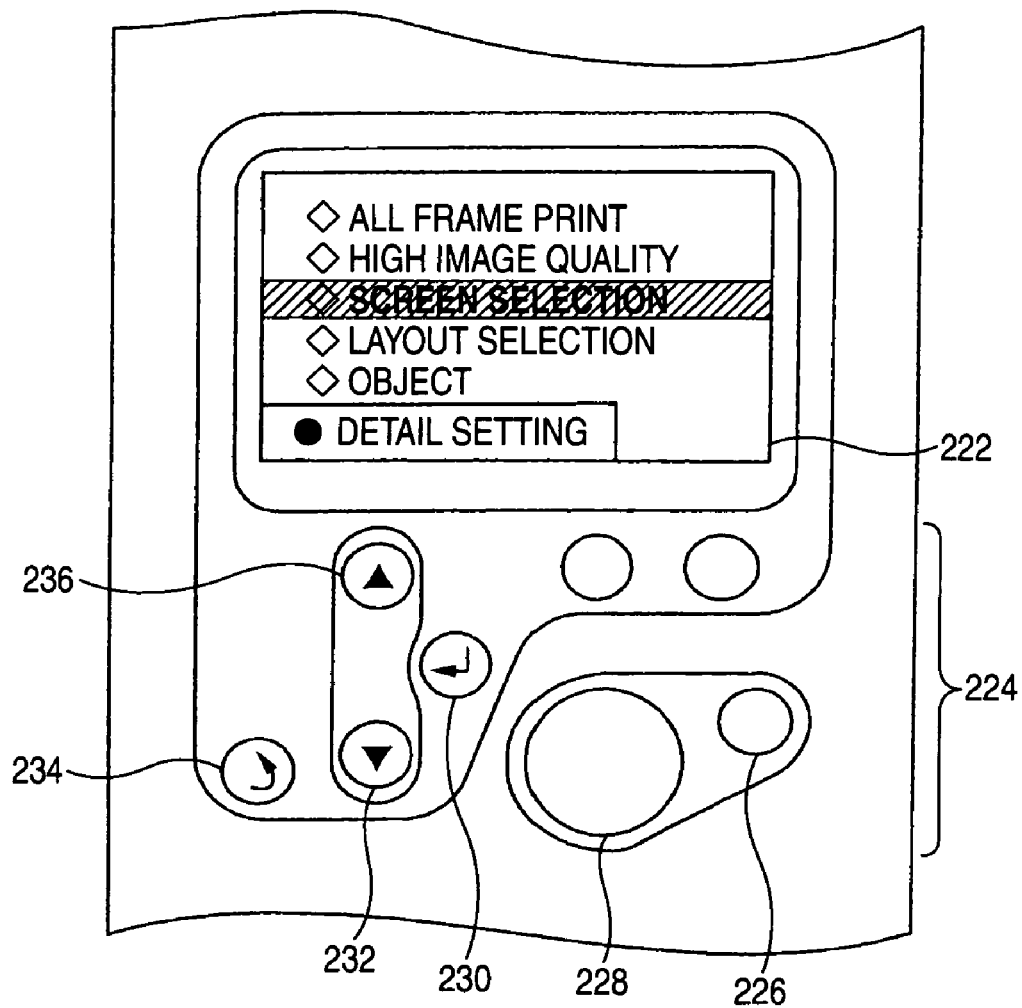
FIG. 12 is a plan view according to the second embodiment of the invention.

FIG. 11 is a perspective view to show the appearance of the printer 200. FIG. 12 is a plan view to show the first display 222 and the operation section 224 of the printer 200 on an enlarged scale. The operation section 224 is provided with a plurality of switches such as an up switch 236, a down switch 232, a determination switch 230, a return switch 234, a print switch 228, and a cancel switch 226. A menu for making various settings is displayed on the first display 222. The up switch 236, the down switch 232, the determination switch 230, and the return switch 234 are switches for selecting a menu item. The print switch 228 is a switch for entering a print start command. The cancel switch 226 is a switch for entering a print cancel command. If the determination switch 230 is pressed in a state in which the screen shown in FIG. 12 is displayed on the first display 222, a transition is made to a mode for selecting the image to be printed. In the mode for selecting the image to be printed, one of the subject images stored in the removable memory 202 is displayed on the second display 218 and as the up switch 236 or the down switch 232 is pressed, the displayed subject image is changed in order. In the mode for selecting the image to be printed, when the print switch 228 is pressed, the subject image selected at the time is printed.

FIG. 13 is a drawing to show screen transition of the second display 218 in the mode for selecting the image to be printed. FIG. 13 (A) shows a screen on which a subject image stored in the removable memory 202 is displayed. To display the subject image being selected, the essential image data of the subject image may be read from the removable memory 202 and scaled down before display, the thumbnail image data of the subject image may be read and displayed intact, or the thumbnail image data of the subject image may be read and scaled up or down before display. If a default image is associated with the subject image selected as the up switch 236 or the down switch 232 is pressed, a part of the default image is displayed as shown in FIG. 13 (B1) or text, icon, etc., indicating that the default image is associated is displayed together with the subject image, as shown in GIG. 13 (B2). If the determination switch 230 is pressed in a state in which the subject image with which a default image is associated is displayed on the second display 218, the whole of the image into which the subject image and the default image are combined is displayed on one screen, as shown in FIG. 13 (C). At this time, if a composite image larger than the subject image is defined according to the layout definition file, the data representing the subject image is scaled down and therefore the subject image is displayed on the second display 218 at a small scaling factor as compared with that in the immediately preceding state.

Figure 14:
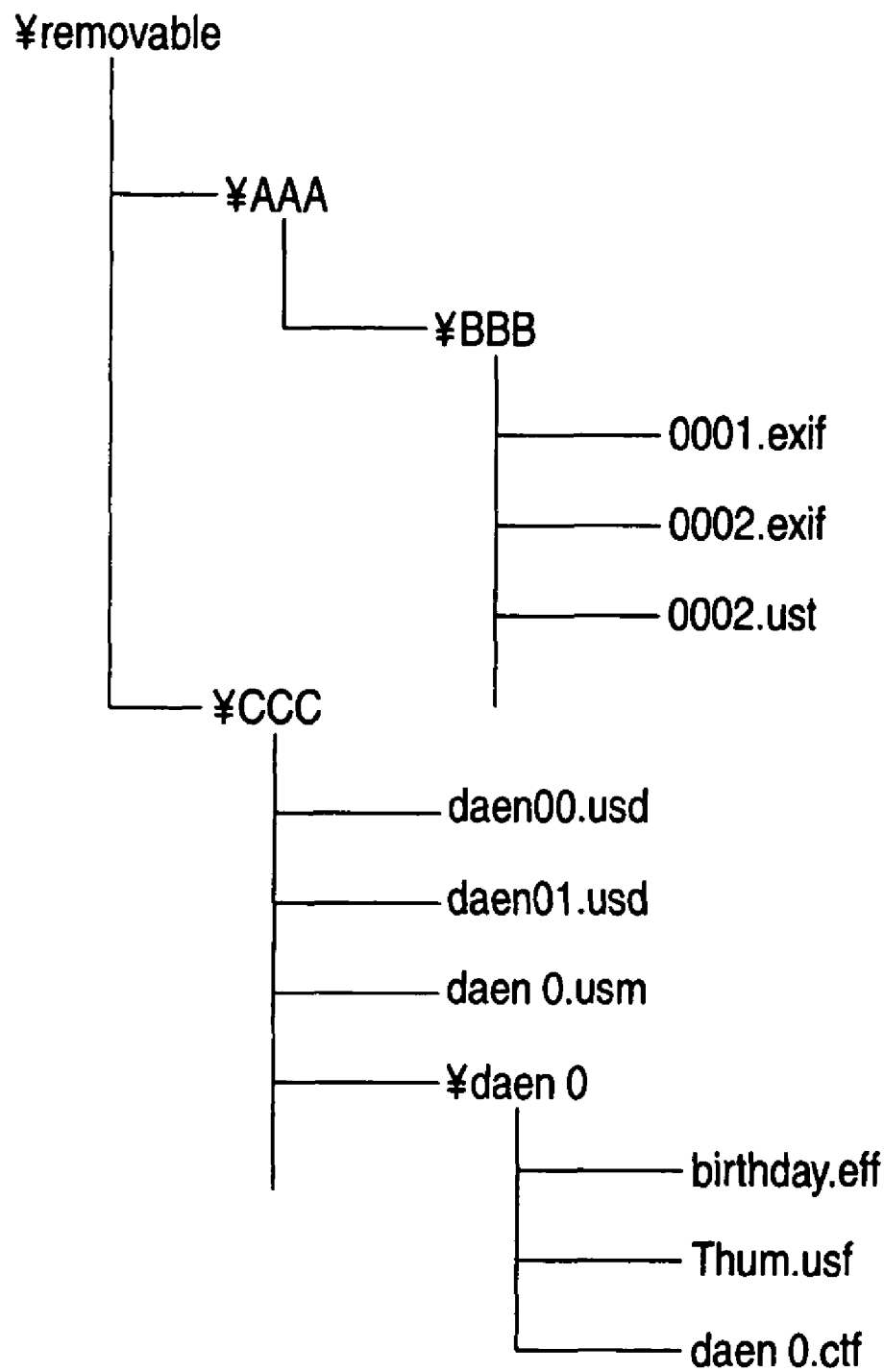
FIG. 14 is a schematic drawing according to the second embodiment of the invention.

FIG. 14 is a schematic drawing to show directories of files stored in the removable memory 202. "£removable" corresponds to the root directory of the removable memory 202.

A subject image file with extension ".exif" contains image data representing a subject image. A file with extension ".ust" is an associating file for associating a subject image file, a layout definition file, and a default image file with each other. The filename of an index file with extension ".usm" is described in the associating file. The filename of the associating file is the same as the filename of the subject image to be associated with the layout definition file described in the index file described in the associating file. For example, a filename of "daen_0.usm" is described in the associating file "0002.ust" and the filenames of the layout definition files "daen01.usd," "daen02.usd," etc., are described in the index file "daen_0.usm." That is, the subject image and the associating file are associated with each other according to their filenames, and the associating file and the index file are associated with each other according to the filename described in the associating file. Further, the index file and the layout definition file are associated with each other according to the filename of the layout definition file described in the index file. The files are associated with each other, whereby a plurality of layout definition files different in paper size and having similitude relation are associated with one subject image file.

A file with extension ".usd" is a layout definition file for defining the print layout of a subject image and a default image and the layout definition file is retained for each paper size. The layout definition file is described later in detail.

Figure 15:
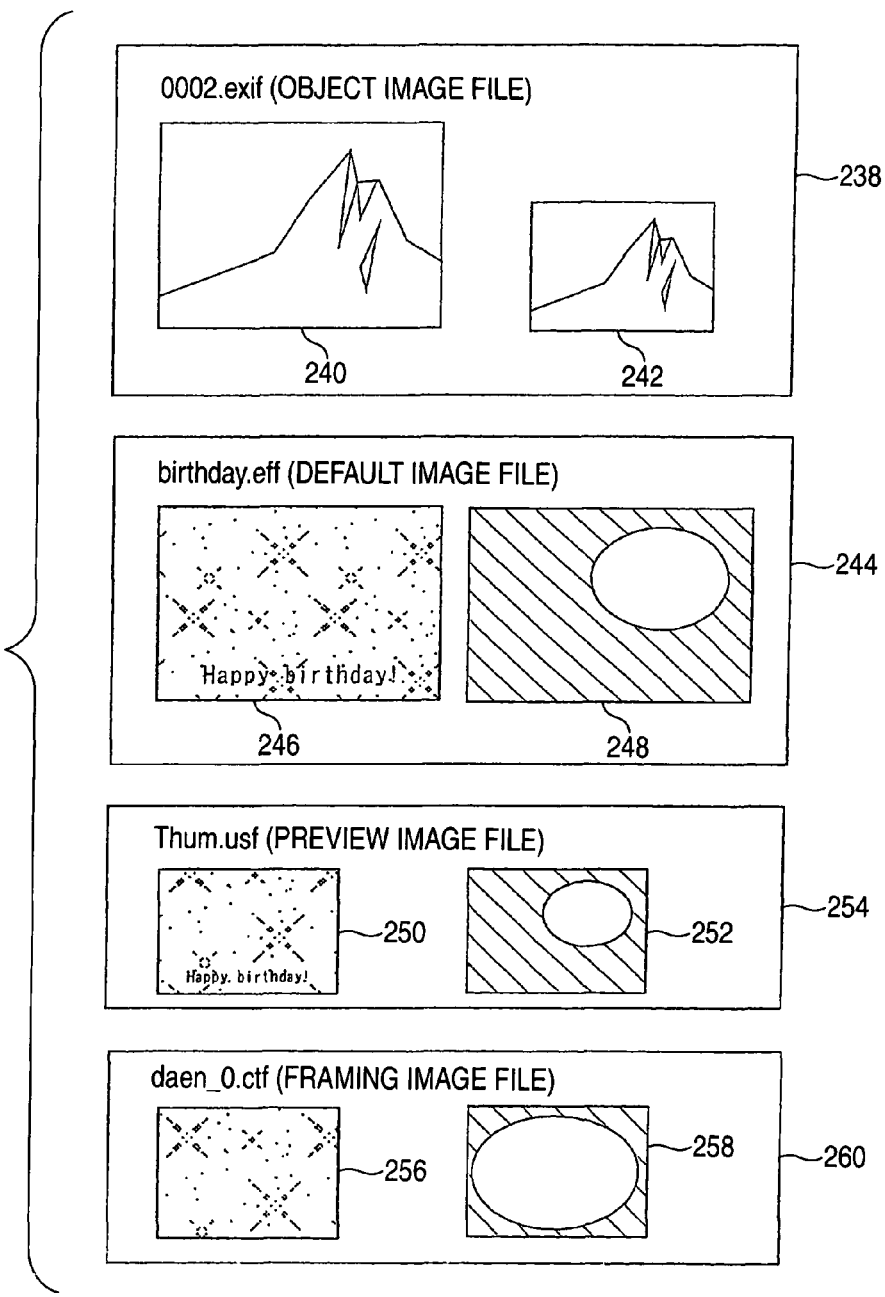
FIG. 15 is a schematic drawing according to the second embodiment of the invention.

FIG. 15 is a schematic drawing to show various images stored in the removable memory 202 in association with each other through the layout definition file.

A subject image file 238 with extension ".exif" contains data representing a subject image, essential image data 240 and thumbnail image data 242, which are recorded in an Exif file format.

A default image file 244 with extension ".eff" contains data representing a default image combined with a subject image based on the layout definition file, default image data 246 and a channel data 248. The a channel data is data setting the transmittance of the upper layer between superposed layers for each pixel. For example, in pixels with the transmittance set to 100% by the a channel data, a pixel in the lower layer rather than a pixel in the upper layer is adopted as a pixel of a composite image. If a script for drawing a subject image and a default image is described in one layout definition file, the subject image and the default image are related to each other through the layout definition file.

A preview image file 254 with extension ".usf" contains data to display the layout defined in the layout definition file on a display of a playback apparatus such as a printer or a personal computer, preview image data 250 and a channel data 252. The size of a preview image is matched with the size of a thumbnail image defined in the industrial standard such as Exif, for example, whereby it is made possible to display the layout defined in the layout definition file at high speed using hardware for displaying the thumbnail image data of subject images at high speed.

A framing image file 260 with extension ".ctf" contains data to display a part of the default image defined in the layout definition file (framing image) on an LCD of a digital camera, framing image data 256 and a channel data 258. A framing image is displayed on an LCD of a digital camera, whereby appropriate framing responsive to the shape of the frame into which a default image is fitted is made possible.

As shown in FIG. 14, the data representing a default image, the data representing a preview image, and the data representing a framing image are stored in the folder of the same name as the filename of the index file describing the filenames of the layout definition files corresponding to the data.

Figure 17:
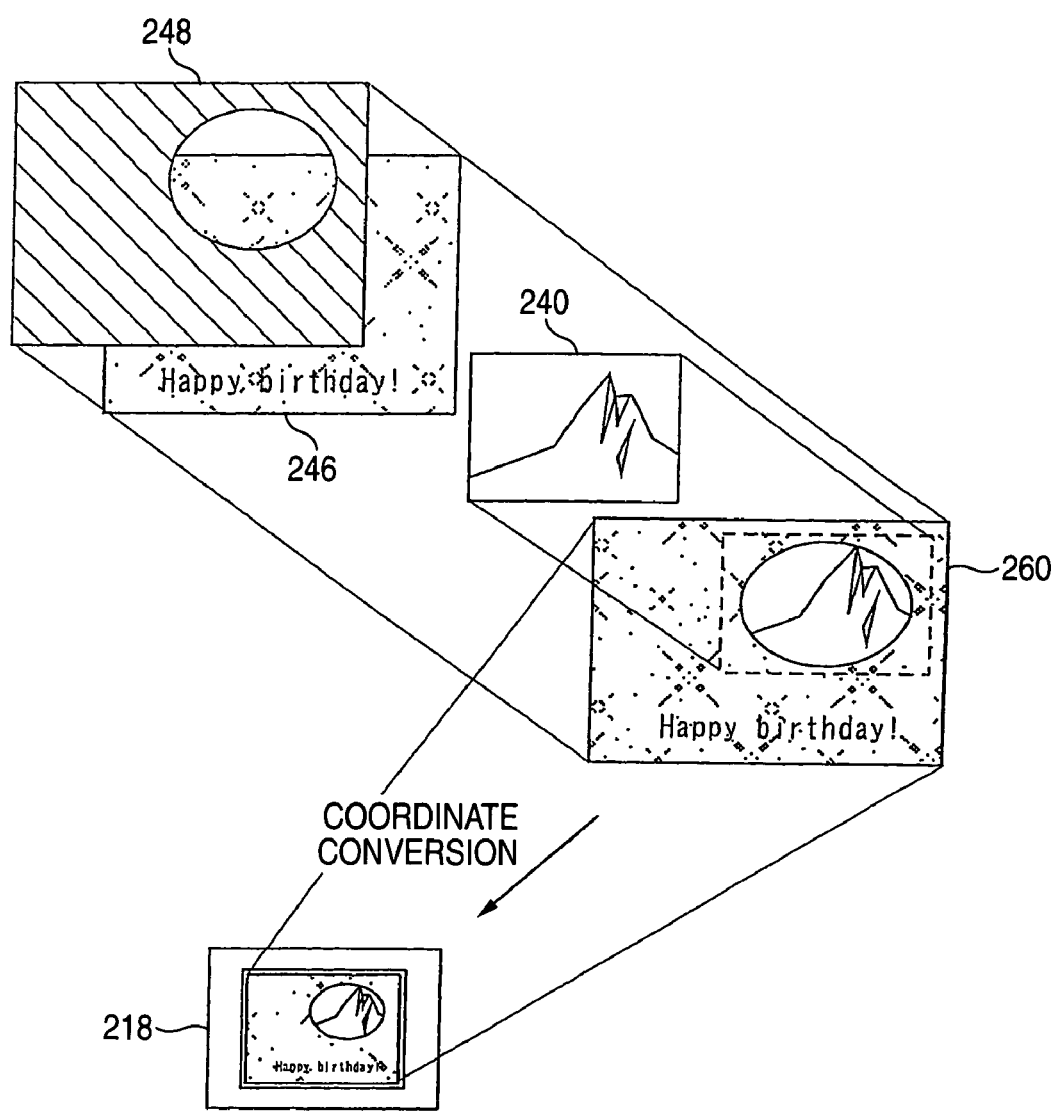
FIG. 17 is a schematic drawing according to the second embodiment of the invention.

FIG. 16 is a schematic drawing to show the contents of a layout definition file. FIG. 17 is a schematic drawing to show processing of laying out a subject image and a default image for a postcard 260 using the layout definition file. In the layout definition file, the layout of the subject image and the default image is defined by a script. The script defines the print paper size, the print paper orientation, the image frames to place the subject image and the default image on print paper, etc., so that they can be interpreted uniquely in a printer, etc. Specifically, for example, "postcard" as the paper size and "landscape" as the print paper orientation are described by the script, the image frame (for example, upper left coordinates of the frame "(x1, y1)" and lower right coordinates of the frame "(x2, y2)") is described by the script for each subject image to be printed, and the filename of the default image file (for example, "birthday.eff") and the image frame (for example, upper left coordinates of the frame "(x3, y3)" and lower right coordinates of the frame "(x4, y4)") are described by the script for each default image to be printed.

In the mode for selecting the subject image to be printed, one of the subject image files stored in a predetermined directory of the removable memory 202 is selected in order each time the up switch 236 or the down switch 232 is pressed. If the associating file of the same filename as the selected subject image file is stored in the directory, a screen indicating that a layout definition file is associated with the selected subject image file is displayed as shown in FIG. 13 (B1) or FIG. 13 (B2). In this case, if the print switch 228 is pressed, the selected subject image file is printed in accordance with the script described in the layout definition file associated with the subject image file.

Figure 19:
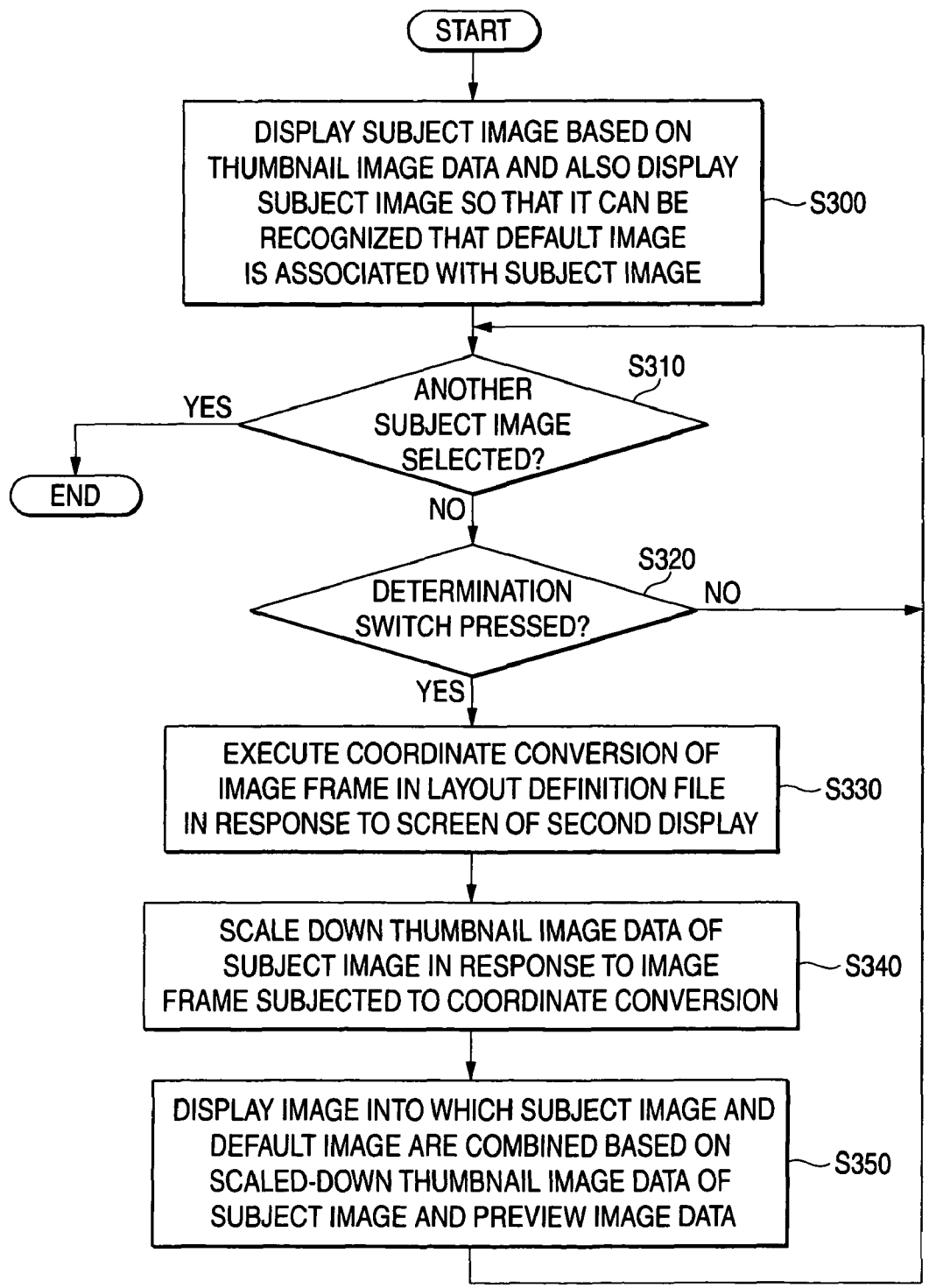
FIG. 19 is a flowchart according to the second embodiment of the invention.

FIG. 13 (B1) and FIG. 13 (B2) show a state in which "0002.exif" shown in FIG. 14 is selected. Processing when a subject image file stored in the removable memory in association with default image data is selected will be discussed below with reference to a flowchart of FIG. 19:

First, the thumbnail image data 242, the framing image data 256, and the α channel data 258 shown in FIG. 15 are read from the removable memory 202, and the thumbnail image data 242 and the framing image data 256 are superposed on each other on the second display 218 as shown in FIG. 13 (B1) (S300). If the size of the thumbnail image data and that of the framing image data match, since the second display 218 and the second display control section 216 are configured so as to be able to fast display the whole of thumbnail image data conforming to Exif on one screen, even if the framing image is superposed on the subject image on the display, a decrease in the display speed is suppressed. To display screen A in FIG. 13 (B2) and FIG. 18, image data representing "with frame" stored in the ROM of the control section 212 may be displayed in the upper layer of the thumbnail image data 242 of the subject image.

If the up switch 236 or the down switch 232 is pressed in a-state in which the subject image is displayed on the second display 218, another subject image file is selected (S310).

If the determination switch 230 is pressed in a state in which the subject image is displayed on the second display 218, the following processing for displaying the whole of the image into which the subject image and the default image are combined on one screen is started (S320): The following processing may be started when a timer started when a new subject image file was selected times out.

First, the layout definition file is read and coordinate conversion of the image frame described in the script is executed in response to the screen of the second display 218 as shown in FIG. 17 (S330) A file describing the script defining the image frame responsive to the screen of the second display 218 may be previously associated with the index file, etc., for storage. In this case, it is not necessary to read the layout definition file and it is not necessary either to execute coordinate conversion of the image frame in the layout definition file.

Figure 18:
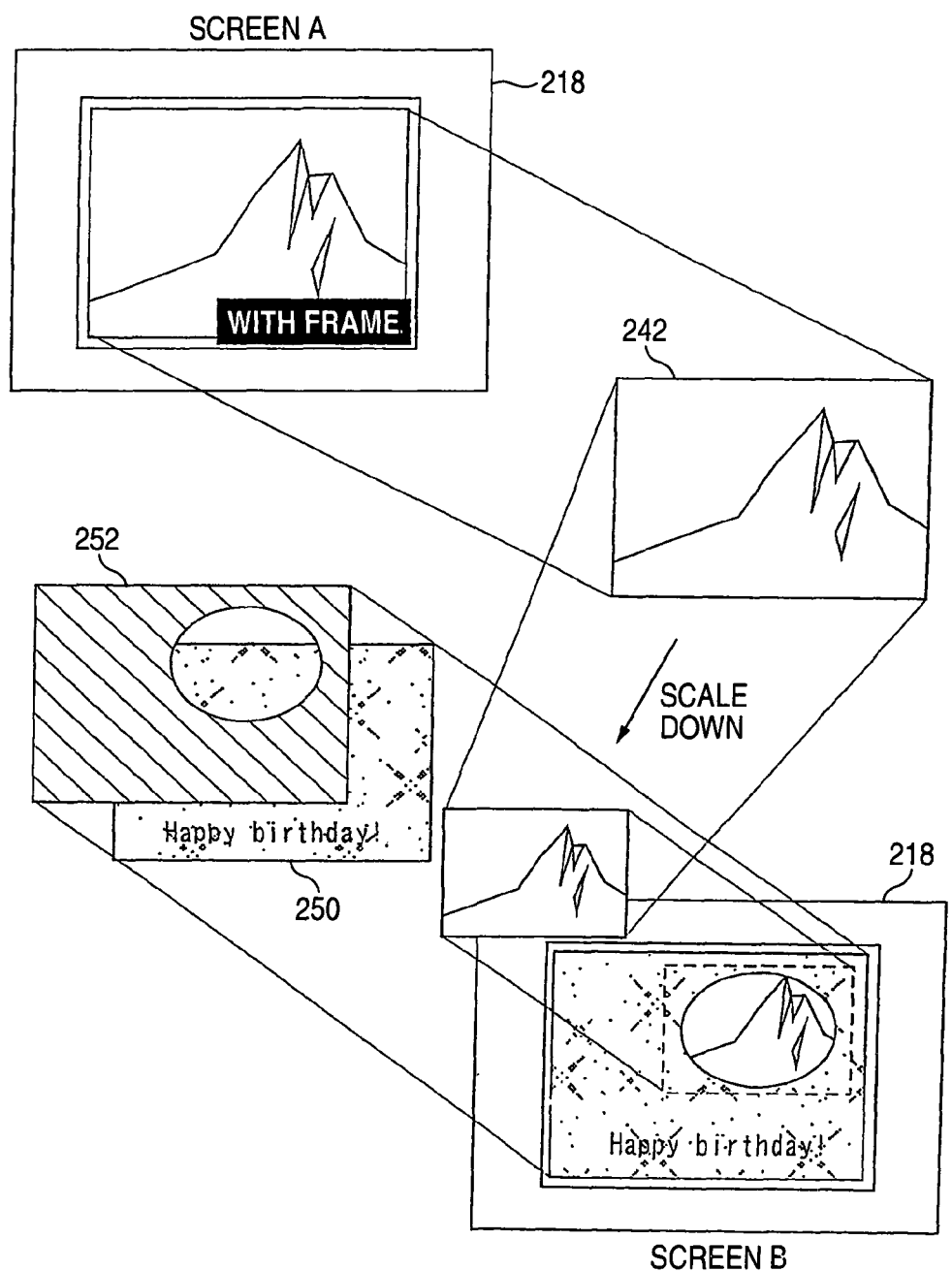
FIG. 18 is a schematic drawing according to the second embodiment of the invention.

Next, the thumbnail image 242 representing the subject image is scaled down in response to the image frame subjected to the coordinate conversion as shown in FIG. 18 (S340).

Next, the preview image data 250 and the α channel data 252 in the preview image file associated with the subject image file through the index file are read from the removable memory 202, Subsequently, the whole of the image into which the subject image and the default image are combined is displayed on one screen based on the scaled-down thumbnail image 242, the preview image data 250, and the a channel data 252, as shown in screen B in FIG. 18.

According to the second embodiment of the invention described above, when the subject image input from the removable memory 202 is displayed on the second display, the thumbnail image data representing the subject image is scaled down or up at a specific scaling factor (first scaling factor) (the scaling factor may be 1, namely, the thumbnail image data may not be scaled up or down) regardless of whether or not a default image is associated with the subject image, and the subject image is displayed based on the scaled-down or scaled-up thumbnail image data. Therefore, even if the size of the subject image is small with respect to the composite image provided by combining the default image and the subject image are combined, the subject image recorded in the removable memory 202 can be checked in a short time.

On the other hand, if a default image is associated with the subject image for storage in the removable memory 202, the subject image is superposed on the default image for print, so that the whole of the printed image can also be displayed on one screen of the second display 218. At this time, if the subject image is smaller than the composite image, the thumbnail image data is scaled down or up at a smaller scaling factor than the first scaling factor and the image into which the subject image and the default image are combined is displayed on one screen based on the scaled-down or scaled-up thumbnail image data and the preview image file. Therefore, even it the composite image provided by combining the default image and the subject image are combined is larger than the subject image, the result of combining the subject image and the default image can be checked on one screen.

What is claimed is:

1. A digital camera comprising:
   a display;
   an image generating unit;
      wherein the image generating unit is configured to read out, from a storing unit, a first image, a subject image and a framing image, the framing image including a part of the first image;
      wherein the image generating unit is configured to generate a first composite image by synthesizing the subject image, at a first scaling factor, with the part of the first image; and
      wherein the image generating unit is configured to generate a second composite image including the framing image and the subject image, by synthesizing the subject image, at a second scaling factor smaller than the first scaling factor, with the framing image; and
   a display controlling unit configured to display the first composite image, including the subject image at the first scaling factor, and the second composite image, including the subject image at the second scaling factor, on the display,
   wherein the display controlling unit is configured to replace, on the display, one of the first composite image and the second composite image with the other of the first composite image and the second composite image.

2. The digital camera according to claim 1, wherein the subject image included in the second composite image displayed on the display is larger in size than the subject image included in the first composite image displayed on the display.

3. The digital camera according to claim 1, further comprising:
   a print preview unit; and
   an automatic switch unit configured to cause the display controlling unit to display the first image for a predetermined time, and then cause the print preview unit to display the first composite image.

4. The digital camera according to claim 1, further comprising:
   a print preview unit; and
   a manual switch unit configured to accept a switch command when the first image is displayed by the display controlling unit, and configured to cause the print preview unit to display the first composite image after accepting the switch command.

5. The digital camera according to claim 1, wherein the display controlling unit is configured to display, on the display, a whole of the first composite image.

6. The digital camera according to claim 1, wherein the display controlling unit is configured to sequentially display the first composite image and the second composite image.

7. An image processing apparatus, comprising:
   a display;
   an image generating unit;
      wherein the image generating unit is configured to read out, from a storing unit, a first image, a subject image and a framing image, the framing image including a part of the first image;
      wherein the image generating unit is configured to generate a first composite image by synthesizing the subject image, at a first scaling factor, with the part of the first image; and
      wherein the image generating unit is configured to generate a second composite image including the framing image and the subject image, by synthesizing the subject image, at a second scaling factor smaller than the first scaling factor, with the framing image; and
   a display controlling unit configured to display the first composite image, including the subject image at the first scaling factor, and the second composite image, including the subject image at the second scaling factor, on the display,
   wherein the display controlling unit is configured to replace, on the display, one of the first composite image and the second composite image with the other of the first composite image and the second composite image.

8. The image processing apparatus according to claim 7, wherein the subject image included in the second composite image displayed on the display is larger in size than the subject image included in the first composite image displayed on the display.

9. The image processing apparatus according to claim 7, further comprising:
   a print preview unit; and
   an automatic switch unit configured to cause the display controlling unit to display the first image for a predetermined time, and then cause the print preview unit to display the first composite image.

10. The image processing apparatus according to claim 7, further comprising:
    a print preview unit; and
    a manual switch unit configured to accept a switch command when the first image is displayed by the display controlling unit, and configured to cause the print preview unit to display the first composite image after accepting the switch command.

11. The image processing apparatus according to claim 7, wherein the display controlling unit is configured to display, on the display, a whole of the first composite image.

12. The image processing apparatus according to claim 7, wherein the display controlling unit is configured to sequentially display the first composite image and the second composite image.

13. An image processing apparatus comprising:
    a display;
    an image generating unit;
       wherein the image generating unit is configured to read out, from a storing unit, a first image, a subject image and a framing image, the framing image including a part of the first image;
       wherein the image generating unit is configured to generate a first composite image by synthesizing the subject image, at a first scaling factor, with the part of the first image; and
       wherein the image generating unit is configured to generate a second composite image including the framing image and the subject image, by synthesizing the subject image, at a second scaling factor smaller than the first scaling factor, with the framing image; and
    a display controlling unit configured to display the second composite image, including the subject image at the second scaling factor, on the display before displaying the first composite image, including the subject image at the first scaling factor, on the display,
    wherein the display controlling unit is configured to display the first composite image on the display, after displaying the second composite image on the display.

14. The image processing apparatus according to claim 13, wherein the subject image included in the second composite image displayed on the display is larger in size than the subject image included in the first composite image displayed on the display.

15. The image processing apparatus according to claim 13, further comprising:
   a print preview unit; and
   an automatic switch unit configured to cause the display controlling unit to display the first image for a predetermined time, and then cause the print preview unit to display the first composite image.

16. The image processing apparatus according to claim 13, further comprising:
   a print preview unit; and
   a manual switch unit configured to accept a switch command when the first image is displayed by the display controlling unit, and configured to cause the print preview unit to display the first composite image after accepting the switch command.

17. The image processing apparatus according to claim 13, wherein the display controlling unit is configured to display, on the display, a whole of the first composite image.

18. The image processing apparatus according to claim 13, wherein the display controlling unit is configured to sequentially display the first composite image and the second composite image.

19. The image processing apparatus according to claim 7, wherein the second composite image does not include any part of the first image other than the part of the first image included in the framing image.

20. The image processing apparatus according to claim 7, wherein the first image includes the part of the first image and a remainder of the first image, the remainder of the first image comprising all parts of the first image other than the part of the first image, and
   wherein the first composite image comprises the remainder of the first image.

21. The image processing apparatus according to claim 7, wherein data of the part of the first image is different from data of the framing image in resolution.

* * * * *